US010138627B2

(12) United States Patent
McCarville et al.

(10) Patent No.: US 10,138,627 B2
(45) Date of Patent: Nov. 27, 2018

(54) METHOD OF ASSEMBLY OF COMPOSITE CORE SANDWICH EDGE JOINT

(71) Applicant: THE BOEING COMPANY, Chicago, IL (US)

(72) Inventors: Douglas McCarville, Bonney Lake, WA (US); Juan Carlos Guzman, Manson, WA (US); Michael Leslie Hand, Huntington Beach, CA (US); Jordan O. Birkland, Lynnwood, WA (US); Alexandra K. Dillon, Sedro-Woolley, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/614,041

(22) Filed: Jun. 5, 2017

(65) Prior Publication Data
US 2018/0230693 A1    Aug. 16, 2018

Related U.S. Application Data

(63) Continuation-in-part of application No. 15/432,024, filed on Feb. 14, 2017.

(51) Int. Cl.
*B32B 3/20*     (2006.01)
*E04B 1/61*     (2006.01)
*E04C 2/34*     (2006.01)
*E04C 2/32*     (2006.01)
(Continued)

(52) U.S. Cl.
CPC .............. *E04B 1/6116* (2013.01); *E04B 2/92* (2013.01); *E04C 2/205* (2013.01); *E04C 2/32* (2013.01); *E04C 2/3405* (2013.01); *B32B 2250/40* (2013.01); *E04B 1/6108* (2013.01); *E04C 2002/3455* (2013.01); *Y10T 428/195* (2015.01)

(58) Field of Classification Search
CPC ............. Y19T 428/195; B32B 2250/40; Y10T 403/553; Y10T 403/635
See application file for complete search history.

(56) References Cited

U.S. PATENT DOCUMENTS 8,784,596 B2   7/2014 Hand et al.
8,875,931 B2   11/2014 Hand et al.

FOREIGN PATENT DOCUMENTS

EP   2455625 A2   5/2012

OTHER PUBLICATIONS

Extended European Search Report for EP Application No. 17203716.0 dated Jul. 17, 2018.

*Primary Examiner* — Alexander S Thomas
(74) *Attorney, Agent, or Firm* — Marshall, Gerstein & Borun LLP

(57) ABSTRACT

A composite wall assembly edge joint, includes a first composite buildup pad secured to a first composite face sheet with the first composite buildup pad having a first tapered section with a first inclined surface which extends in a first direction and having a second section which extends from the first tapered section with a second surface which extends in a second direction, different from the first direction, toward a first end of the first composite face sheet. The assembly further includes a composite flute core member, having a tapered first portion secured to the first tapered section; a second portion secured to the first composite face sheet; and a third portion which extends in the second direction, away from the tapered first portion, toward the first end of the first composite face sheet secured to the second section.

20 Claims, 21 Drawing Sheets

(51) Int. Cl.
*E04C 2/20* (2006.01)
*E04B 2/92* (2006.01)

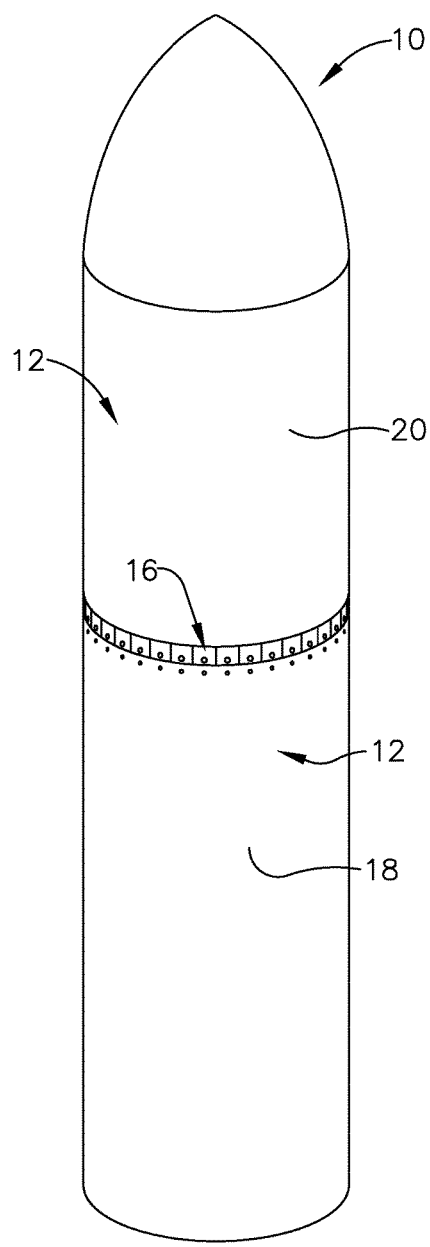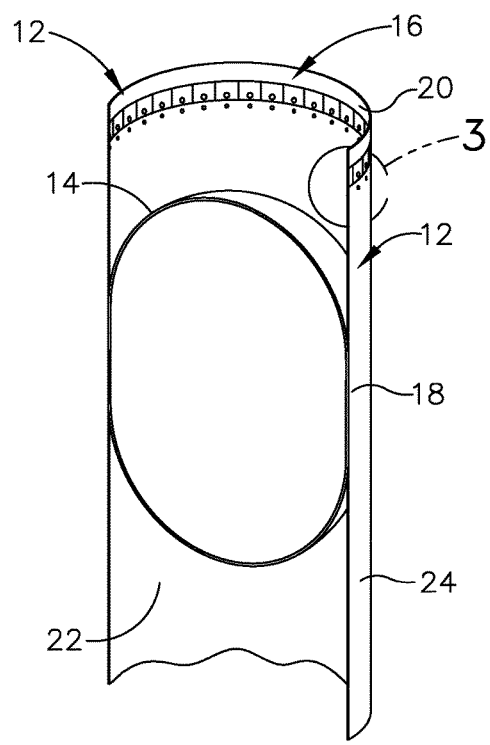
FIG. 1
FIG. 2

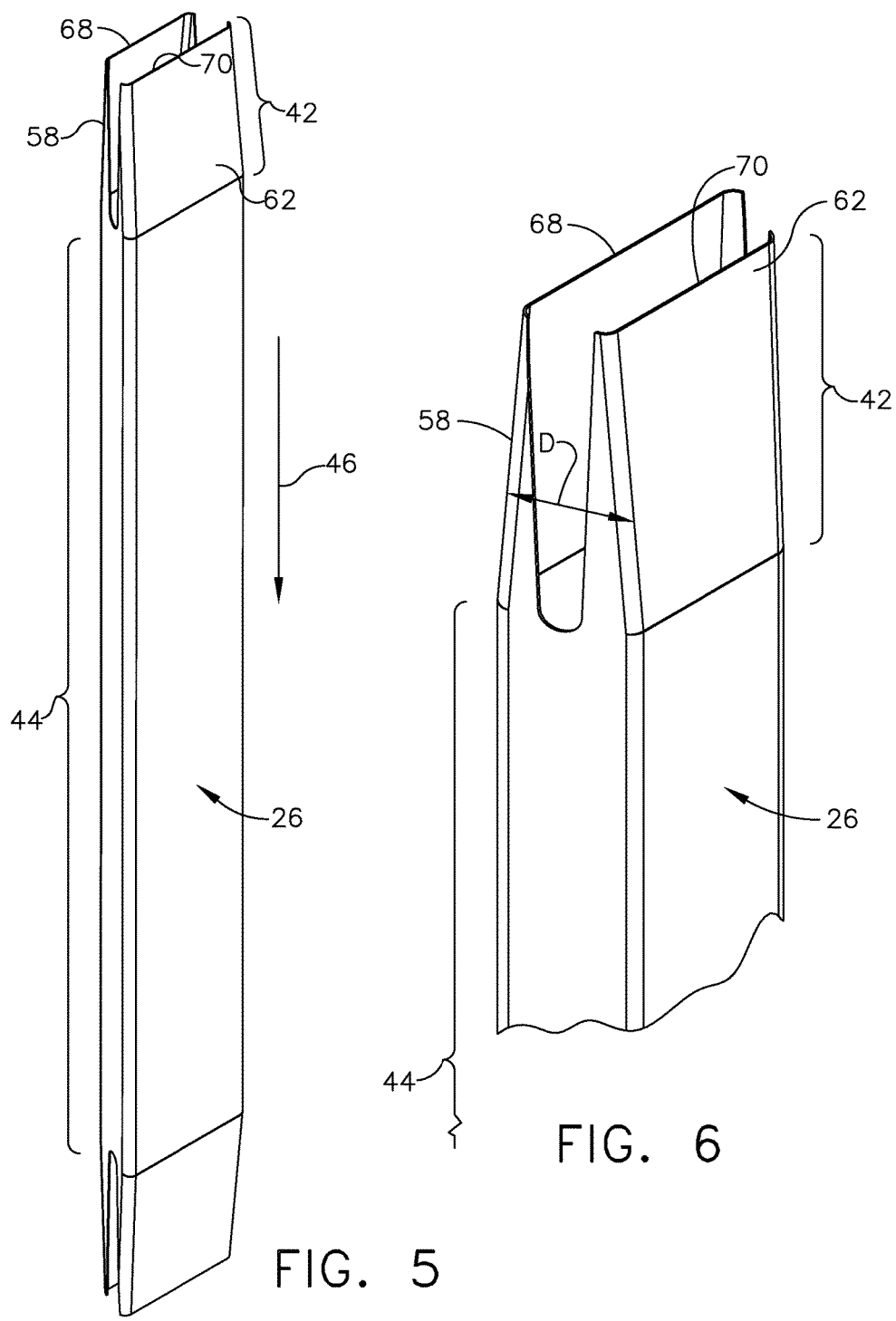

METHOD OF ASSEMBLY OF COMPOSITE CORE SANDWICH EDGE JOINT

CROSS-REFERENCE TO RELATED APPLICATION

This application is a continuation-in-part of U.S. patent application Ser. No. 15/432,024, filed Feb. 14, 2017 and of U.S. patent application Ser. No. 15/468,793 filed Mar. 24, 2017.

FIELD

This disclosure generally relates to an edge joint for composite materials and more particularly an edge joint and method to assemble an edge joint for composite sandwich shell edges.

BACKGROUND

Composite structures are being developed to replace aluminum components for use with space launch vehicles. Replacement of aluminum components with lighter, lower cost, and less thermally conductive composite components will enable larger payloads, reduced operating costs and longer missions due to propellant boil-off reduction.

In the construction of the composite structures, composite fluted core sandwich shell wall assemblies were employed. These wall assemblies were used, for example, in the construction of an external structural wall assembly of a rocket or in the construction of a cryogenic tank assembly. Sections of the wall assemblies were joined together with joint edge structures so as to connect adjoining sections of the structure being assembled. As higher line load demands are encountered and needed than originally used in smaller rockets or structures positioned higher in a stack, for example, an improved edge joint construction is needed for constructing the structural assembly with composite fluted core sandwich shell wall sections.

The lighter load shell edge joints originally developed required relatively large openings between intermittently spaced shell edge reinforcements to allow extraction of tooling. As a result of the relatively large openings, that construction did not permit more closely spaced fasteners that would be needed for a joint that needed to carry a higher load capacity. The lighter load shell edge joint construction also forced load into the face sheets of the structure at the ends of the flutes which necessitated positioning a local doubler for carrying higher loads for which the original joint was not designed.

An improved shell edge joint for a composite fluted core sandwich shell wall is needed and a method to assemble a composite wall assembly edge joint is needed that will provide improved load carrying capabilities such that more load can be carried and distributed permitting additional and more closely spaced fasteners. This improved shell edge joint performance for increased load capacity needs to be accomplished with minimizing the increase in vehicle weight.

SUMMARY

An example of a composite wall assembly edge joint includes a first composite buildup pad secured to a first composite face sheet. The first composite buildup pad has a first tapered section with a first inclined surface which extends in a first direction and has a second section which extends from the first tapered section with a second surface which extends in a second direction, different from the first direction, toward a first end of the first composite face sheet. The composite wall assembly edge joint also includes a composite flute core member which includes a tapered first portion secured to the first tapered section of the first composite buildup pad; a second portion which extends in a third direction away from the tapered first portion and is secured to the first composite face sheet; and a third portion which extends in the second direction, away from the tapered first portion, toward the first end of the first composite face sheet secured to the second section of the first composite buildup pad.

An example of a method of for assembling a composite wall assembly edge joint includes laying up a first composite buildup pad onto a first composite face sheet with the first composite buildup pad having a first tapered section with a first inclined surface which extends in a first direction and having a second section which extends from the first tapered section with a second surface which extends in a second direction, different from the first direction, toward a first end of the first composite face sheet. The method further includes laying up a composite flute core member which includes: positioning a tapered first portion onto the tapered first section of the first composite buildup pad; positioning a second portion, to extend in a third direction away from the first tapered portion, onto the first composite face sheet; and positioning a third portion, to extend in the second direction, away from the first tapered portion, toward the first end of the first composite face sheet and onto the second section of the first composite buildup pad.

An example of a method of for assembling a composite wall assembly edge joint includes laying up a first composite buildup pad onto a first composite face sheet with the first composite buildup pad having a first tapered section. The first tapered section has a first inclined surface which extends in a first direction having a second section which extends from the first tapered section with a second surface which extends in a second direction, different from the first direction, toward a first end of the first composite face sheet. The method further includes: positioning a cured composite flute core member which includes positioning a tapered first portion onto the first tapered section of the first composite buildup pad with an adhesive film portion positioned between the first tapered portion and the first tapered section of the first composite buildup pad; positioning a second portion, to extend in a third direction away from the tapered first portion, onto the first composite face sheet with an adhesive film portion positioned between the second portion and the first composite face sheet; and positioning a third portion, to extend in the second direction, away from the tapered first portion, toward the first end of the first composite face sheet, onto the second section of the first composite buildup pad with an adhesive film portion positioned between the third portion and second section of the first composite buildup pad.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 1 is a schematic perspective view of a rocket showing an edge joint location on wall of rocket;

FIG. 2 is a partial cut away perspective view of a cross section of the rocket shown in FIG. 1 with a cryogenic propellant tank on board;

FIG. 5 is a perspective view of a composite flute core member of the composite wall assembly shown in FIG. 3;

FIG. 6 is an enlarged partially cut away view of tapered end of the composite flute core member in FIG. 5;

DESCRIPTION

Figure 3:
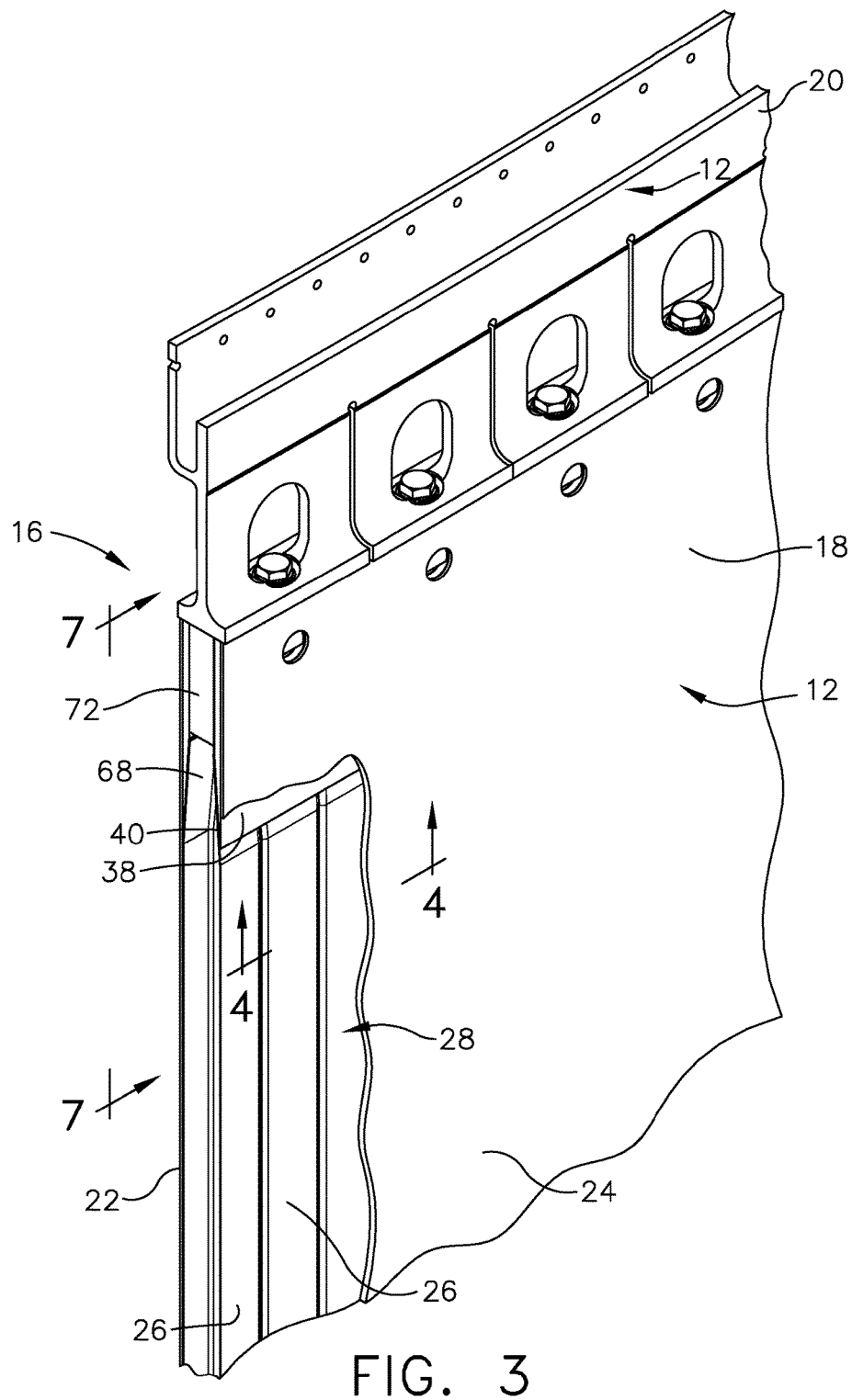
FIG. 3 is a an enlarged partial cut away view of the joint edge of a composite wall assembly of that which is encircled and designated as 3 in FIG. 2.

As mentioned earlier, composite structures are being developed to replace aluminum components or structures for use with a space launch vehicle or rocket 10, such as shown in FIGS. 1 and 2. Replacement of aluminum components with lighter, lower cost, and less thermally conductive composite components will enable larger payloads, reduced operating costs and longer missions due to propellant boil-off reduction.

In the construction of the composite components or structures, an example of such components or structures include using composite fluted core sandwich shell wall assemblies. These wall assemblies are used, for example, in the construction of different portions of rocket or launch vehicle 10 such as for an external structural wall assembly 12 of rocket 10, or in another example for a cryogenic propellant tank with a skirt assembly 14, as seen in FIGS. 1 and 2, respectively. Other components of various versions of rocket 10 can also be constructed with composite structures such as, an inter stage section for a multiple stage rocket as well as for other portions of a rocket. As mentioned above, an example of assembling a composite sandwich shell wall assembly 12 with an improved joint edge 16 will be discussed herein. Improved joint edge 16 joins together, in this example, first section 18 to second section 20 of wall assembly 12 and will provide improved performance for higher line load demands with minimizing weight increase in vehicle or rocket 10.

Figure 4:
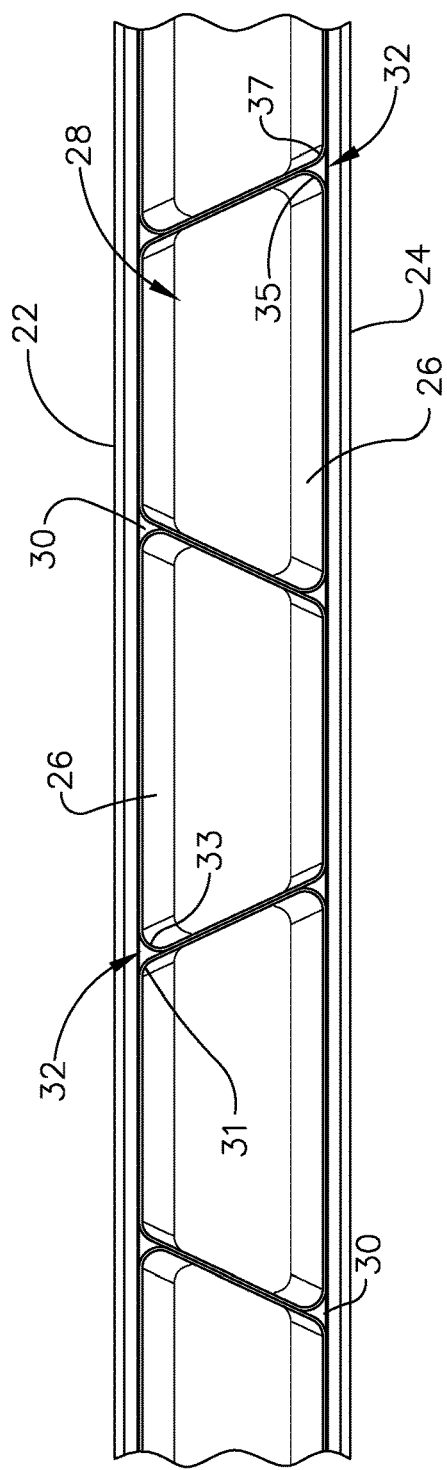
FIG. 4 is cross section view taken along line 4-4 in FIG. 3.

In referring to FIG. 3, edge joint 16 is shown connecting first section 18 to second section 20 of wall assembly 12. Composite fluted core sandwich shell wall assembly 12 includes first or inboard composite face sheet 22 and spaced apart second or outboard composite face sheet 24. Positioned within the spaced apart first and second composite face sheets 22 and 24 are a plurality of flute composite core members 26. An example of flute composite core member 26 is shown in FIGS. 5 and 6. In this example of wall assembly 12, flute composite core members 26 are trapezoidal in shape, as seen in FIG. 4 however the shape can be selected from one of a number of shapes. In this example, trapezoidal shaped flute composite core members 26 are positioned between first and second composite face sheets 22, 24 in succession forming core assembly 28, as seen in FIG. 4. Flute composite core members 26 can be further reinforced with employing a noodle 30 structure positioned in a cavity 32 that forms between adjacent radiuses 31 and 33 of flute composite core members 26 and first composite face sheet 22, as well as, between adjacent radiuses 35 and 37 of flute composite core members 26 and second composite face sheet 24. Wall assembly 12 with core assembly 28 provides a strong and lightweight construction.

In referring to FIGS. 5-8A, composite fluted core sandwich wall assembly 12 with edge joint 16 is shown which accommodates higher line load demands exerted through edge joint 16, whether exerted in compression or in tension. In referring to FIG. 7, first composite buildup pad 34 having first tapered section 36 is secured to and extends along first or inboard composite face sheet 22. Second composite buildup pad 38 having a second tapered section 40 is secured to and extends along second or outboard composite face sheet 24. First and second composite buildup pads 34 and 38 are positioned between spaced apart first and second composite face sheets 22 and 24. Composite flute core member 26 includes tapered first portion 42 and is positioned between and secured to first tapered section 36 and to second tapered section 40. Second portion 44, as seen in FIG. 5, of composite flute core member 26 is positioned between, extends along and is secured to first and second composite face sheets 22 and 24. Second portion 44 of composite flute core member 26 extends in direction 46 away from first portion 42. This construction of tapered first portion 42 of flute composite core member 26 being secured to first and second tapered sections 36 and 40 of first and second composite buildup pads 34 and 38, respectively, provides enhanced load line capabilities for joint edge 16.

Figure 7:
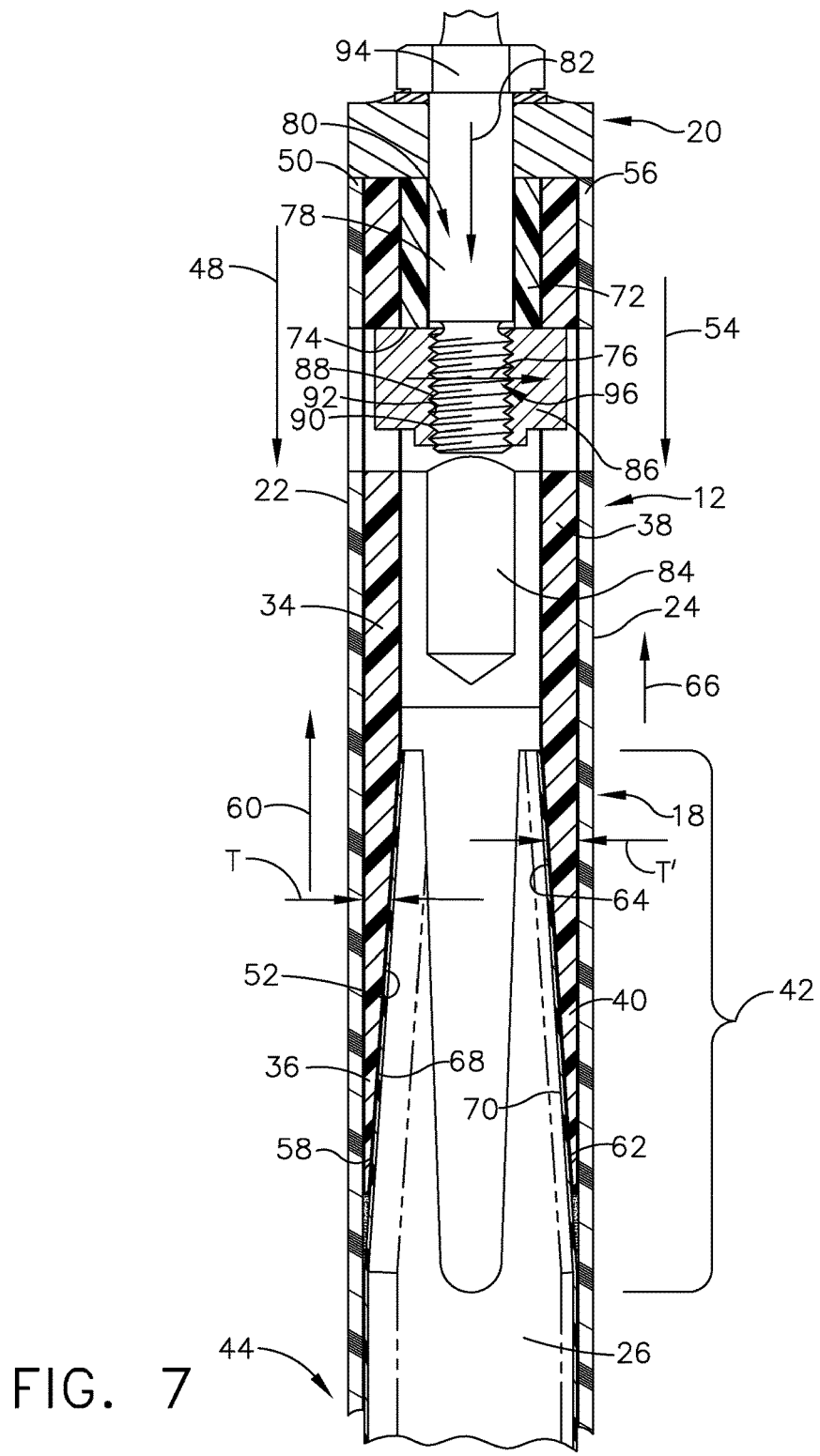
FIG. 7 is a cross section view of the joint edge of the composite wall assembly as seen along line 7-7 in FIG. 3.
Figure 8:
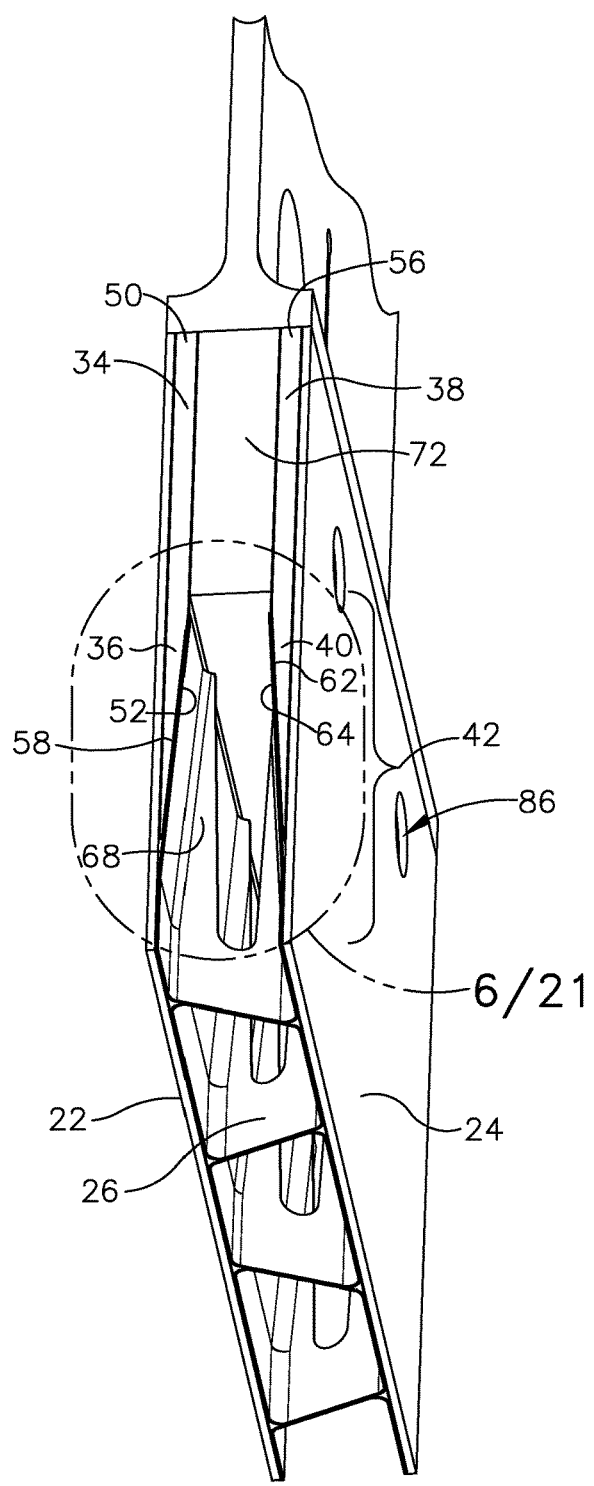
FIG. 8 is a perspective view of cross section as taken along line 4-4 of FIG. 3.
Figure 8A:
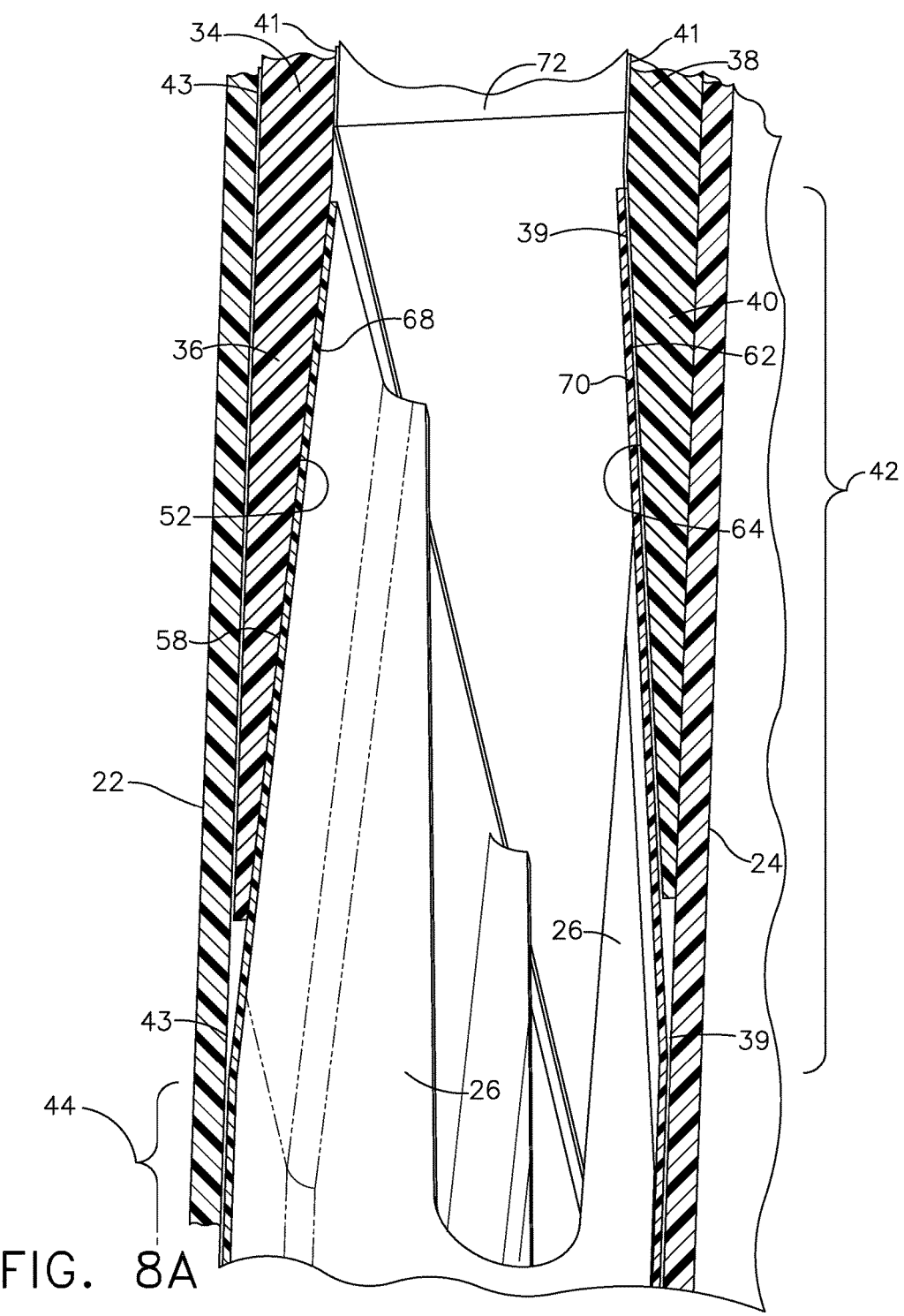
FIG. 8A is an enlarged view of that which is encircled as 8A in FIG. 8.

As seen in FIGS. 7, 8 and 8A, first composite buildup pad 34 extends in a direction 48 away from first end 50 of first or inboard composite sheet face 22. First tapered section 36 of first composite buildup pad 34 has first inclined surface 52 with a thickness T of first tapered section 36 reducing in dimension as first composite buildup pad 34 extends in direction 48 away from first end 50. Second composite buildup pad 38 extends in direction 54 away from second end 56 of second or outboard composite sheet face 24. Second tapered section 40 of second composite buildup pad 38 has second inclined surface 64 with thickness T' of second tapered section 40 reducing in dimension as second composite buildup pad 38 extends in direction 54 away from second end 56.

First portion 42 of flute core member 26 has first inclined surface 58 relative to first composite face sheet 22. Inclined surface 58 extends along first inclined surface 52 of first composite build up pad 34 such that first inclined surface 58 of first portion 42 of composite flute core member 26 is positioned further from first composite face sheet 22 as first portion 42 of composite flute core member 26 extends in direction 60 toward first end 50 of first composite face sheet 22. First portion 42 of composite flute core member 26 has second inclined surface 62 relative to second or outboard face sheet 24 which extends along second inclined surface 64 of the second build up pad 38 such that second inclined surface 62 of first portion 42 of composite flute core member 26 is positioned further from second or outboard face sheet 24 as first portion 42 extends in direction 66 toward second end 56 of second composite face sheet 24.

As seen in FIGS. 5 and 6, first portion 42 of composite flute core member 26 includes first wall member 68 with first inclined surface 58 of first portion 42 of composite flute core member 26 positioned on first wall member 68. First portion 42 of composite flute core member 26 includes second wall member 70 with second inclined surface 62 of first portion 42 of composite flute core member 26 is positioned on second wall member 70. First wall member 68 and second wall member 70 are spaced apart a as seen for example as distance D, as seen in FIG. 6, and converge as first wall member 68 extends in direction 60 of first end 50 of first composite face sheet 22, as seen in FIG. 7, and second wall member 70 extends in direction 66 of second end 56 of the second composite face sheet 24.

As seen in FIGS. 5-8A, first inclined surface 58 of first portion 42 of composite flute core member 26 is co-cured to first inclined surface 52 of first composite build up pad 34. Second inclined surface 62 of the first portion 42 of the composite flute core member 26 is co-bonded to the second inclined surface 64 of second composite build up pad 38. Second portion 44 of composite flute core member 26 is co-bonded to first composite face sheet 22 and to second composite face sheet 24. First composite build up pad 34 is co-bonded to first composite face sheet 22 and second composite build up pad 38 is co-cured to second composite face sheet 24.

In referring to FIGS. 7, 8 and 8A, bridge composite structure 72 is positioned between first composite buildup pad 34 and second composite buildup pad 38. Bridge composite structure 72 is secured to both first and second build up pads 34 and 38 and extends along first composite buildup pad 34 in direction 48 away from first end 50 of first composite face sheet 22 and extends along second composite buildup pad 38 in direction 54 away from second end 56 of second composite face sheet 24.

Bridge composite structure 72, in this example, is post bonded to first composite build up pad 34 and is post bonded to second composite build up pad 38. Further included is first hole 74 which extends in first direction 76 through first composite sheet face 22, first composite build up pad 34, bridge composite structure 72, second composite buildup pad 38 and second composite face sheet 24. First portion 78 of second hole 80 extends through bridge composite structure 72 in second direction 82 transverse to first direction 76 of first hole 74 such that first portion 78 of second hole 80 is in communication with first hole 74 and second portion 84 of second hole 80 extends within bridge composite structure 72 in second direction 82 spaced apart across first hole 74 and aligned with first portion 78 of second hole 80.

Further included is barrel nut 86 having hole 88, which extends through barrel nut 86, with barrel nut 86 positioned within first hole 74 of bridge composite structure 72. Barrel nut 86 has threaded surface 90 defined by inner wall surface 92 of hole 88 with hole 88 of barrel nut 86 positioned aligned with first and second portions 78 and 84 of second hole 80 of bridge composite structure 72. Bolt 94 includes threads 96 compatible to threaded surface 90 defined by the inner wall surface 92 of hole 88 of barrel nut 86. Bolt 94 is positioned within first portion 78 of second hole 80 of bridge composite structure 72. Threads 96 of bolt 94 engage threaded surface 90 defined by inner wall surface 92 of hole 88 of barrel nut 86. With bolt 94 engaged and tightened, as seen in FIG. 7, first section 18 is secured to second section 20 of wall assembly 12.

As will be appreciated in the discussion of an example of the assembly of edge joint 16, composite bridge structure 72 will be installed as a latter element in the joint edge 16 construction which includes the components of first composite or inboard sheet face 22, first composite buildup pad 34, flute composite core member 26, second composite buildup pad 38 and second composite or outboard face sheet 24. With these components assembled composite bridge structure 72 is installed along wall assembly 12. Composite bridge structure 72 can provide the fabricator as needed a substantially continuous wall which extends about wall assembly 12 in which to drill second holes 80 with intersecting corresponding first holes 74. With a substantially continuous wall established by bridge composite structure 72, the fabricator has the flexibility of selectively spacing connecting assemblies of barrel nuts 86 and bolts 94 along joint edge 16 of wall assembly 12 to accommodate load demands as needed through joint edge 16 along wall assembly 12 in connecting, for example, section 18 to section 20 of wall assembly 12. As a result, the fabricator selects the spacing and employs the spacing, as can be seen for example in FIG. 3, as required for load transference across joint edge 16. The load lines will extend along first and second buildup pads 34 and 38, along first and second tapered sections 36 and 40, engage first and second walls 68 and 70 of composite flute core member 26 and in turn extend into first and second face sheets 22 and 24 providing joint edge 16 with an enhanced performance for wall assembly 12.

Figure 9:
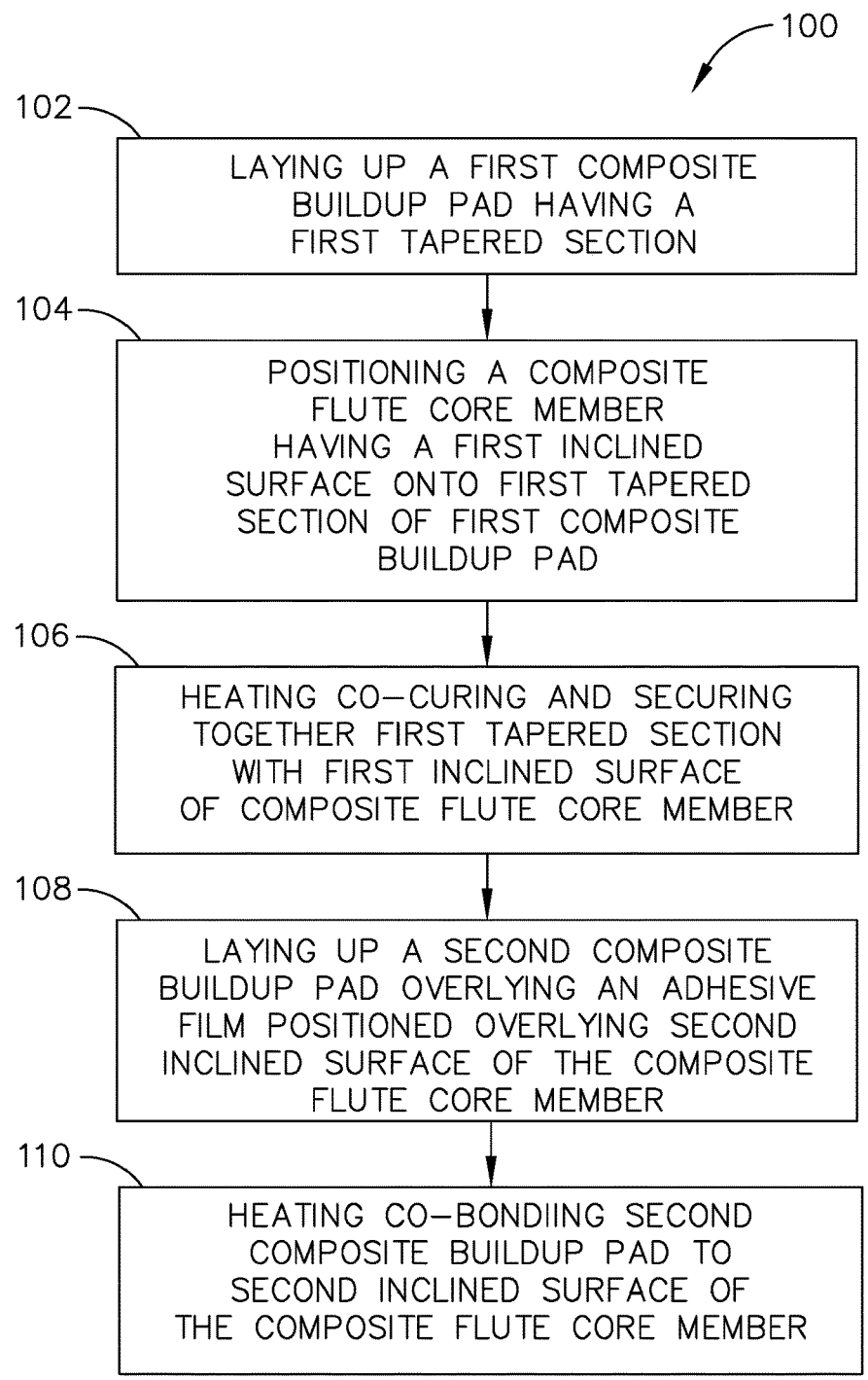
FIG. 9 is a flow chart for a method for assembling a composite wall assembly edge joint.

In referring to FIG. 9, an example of method 100 for assembling composite fluted core sandwich shell wall assembly 12 edge joint 16 is shown. Method 100 includes step 102 of laying up first composite buildup pad 34 having a first tapered section 36 onto a cured first composite or inboard face sheet 22, with an adhesive layer 43, as seen in FIG. 8A, positioned between first composite buildup pad 34 and first composite face sheet 22. Step 102 of laying up first buildup pad 34 further includes the step of laying up of first buildup pad 34 which extends in a direction 48 away from first end 50 of first composite face sheet 22 and configuring first tapered section 36 having first inclined surface 52 with thickness T of first composite buildup pad 34 reducing in dimension as first composite buildup pad 34 extends in direction 48 away from first end 50.

Method 100 further includes step 104 of positioning composite flute core member 26, which includes tapered first portion 42, having a first inclined surface 58 and a second inclined surface 62, wherein, first inclined surface 58 of composite flute core member 26 is positioned onto first tapered section 36 of first composite buildup pad 34. Second portion 44 of composite flute core member 26, as seen in FIG. 5, extends in direction 46 away from first portion 42 along first composite or inboard face sheet 22, as seen in FIGS. 7 and 8A, with adhesive film 43 positioned between second portion 44 of flute composite core member 26 and first composite face sheet 22. Step 104 of positioning of composite flute core member 26 further includes positioning first inclined surface 58 of composite flute core 26 overlying first inclined surface 52 of first composite buildup pad 34 such that first inclined surface 58 of composite flute core member 26 increases in distance away from first composite face sheet 22 as composite flute core member 26 extends in a direction 60 toward first end 50 of first composite sheet face 22.

Method 100 further includes step 106 of heating at least first composite buildup pad 34 and composite flute core member 26, co-curing first composite buildup pad 34 and composite flute core member 26 and securing together first tapered section 36 of first composite buildup pad 34 with first inclined surface 58 of composite flute core member 26 and co-bonding second portion 44 of composite flute core member 26 to first composite or inboard face sheet 22. At the same time, first composite build up pad 34 is co-bonded to first composite face sheet 22.

Method 100 further includes step 108 of laying up second composite buildup pad 38 having a second tapered section wherein the second composite buildup pad is positioned spaced apart from first composite buildup pad 34 and with at least a portion of the second tapered section of second composite buildup pad 38 overlying an adhesive film 39, as seen in FIG. 8A, positioned overlying second inclined surface 62 of first portion 42 of composite flute core member 26. Step 108 of laying up second composite buildup pad 38 includes configuring second inclined surface 64 of second composite buildup pad 38 with second composite buildup pad 38 reducing in thickness T' as second composite buildup pad 38 extends in direction 54 away from second end 56 of second composite face sheet 24 with second inclined surface 62 of first portion 42 of composite flute core member 26 decreases in distance from first composite face sheet 22 as second inclined surface 62 of composite flute core member 26 extends in direction 60 toward first end 50 of first composite face sheet 22.

With second composite buildup pad 38 positioned overlying second inclined surface 62 of composite flute core member 26 step 110 is employed of heating at least second composite buildup pad 38 and co-bonding second composite buildup pad 38 to second inclined surface 62 of first portion 42 of composite flute core member 26.

Step 108 of laying up second composite buildup pad 38 further includes the step of laying up a second composite face sheet 24 onto second composite build-up pad 38 and onto second portion 44 of composite flute core member 26 with positioning adhesive film 39 between second portion 44 of composite flute core member 26 and second composite face sheet 24, as seen in FIG. 8A. Step 110 of heating at least second composite buildup pad 38 further includes co-curing second composite buildup pad 38 and second composite face sheet 24 together and co-bonding second portion 44 of composite flute core member 26 to second composite face sheet 24.

Method 100 further includes a step of laying up composite bridge structure 72 and post bonding composite bridge structure 72 to first and second composite buildup pads 36 and 38 respectively, with adhesive film 41, as seen in FIG. 8A. Adhesive film 41 is positioned between composite bridge structure 72 and first composite build up pad 36 and between composite bridge structure 72 and second composite buildup pad 38.

With composite bridging structure 72 post bonded to first and second composite buildup pads 34 and 38, respectively, the step of laying up composite bridge structure 72 further includes a step of drilling first hole 74 in a first direction 76 through first composite face sheet 22, first composite buildup pad 34, composite bridge structure 72, second composite buildup pad 38 and second composite face sheet 24. The step of laying up the composite bridge structure 72 further includes a step of drilling first portion 78 of second hole 80 in composite bridge structure 72 in a direction 82 transverse to first direction 76 placing first portion 78 in communication with first hole 74 and continue drilling second portion 84 of second hole 80 spaced apart across first hole 74 from first portion 78 of second hole 80 and aligned with first portion 78 of second hole 80. With first hole 74 and second hole 80 drilled, the step of laying up composite bridge structure 72 further includes a step of inserting barrel nut 86 into first hole 74 and inserting bolt 94 into second hole 80 and securing bolt 94 to barrel nut 86. With securement of bolt 94, first section 18 and second section 20 of wall assembly 12 are secured together as seen in FIG. 7.

Figure 10:
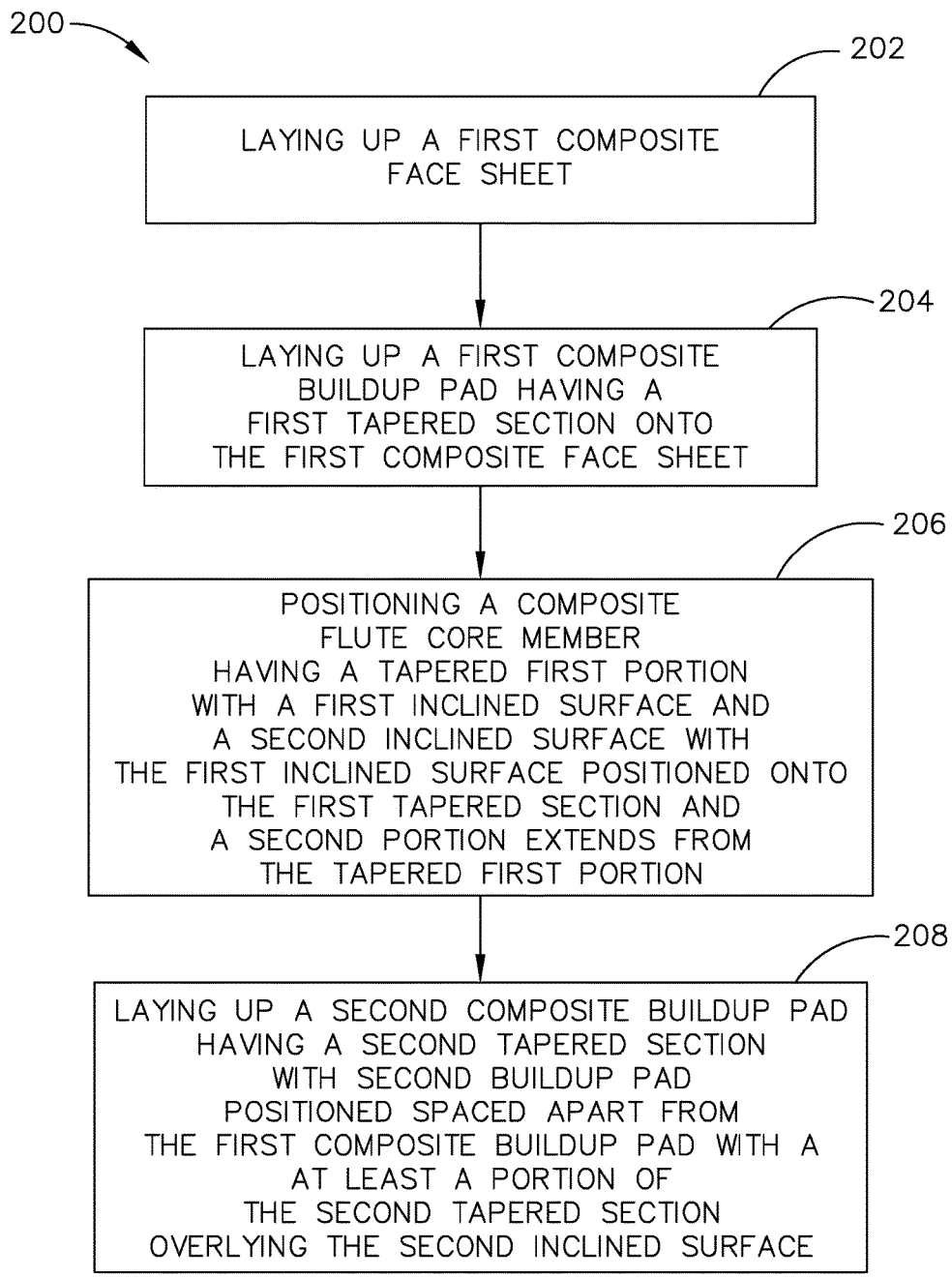
FIG. 10 is a flow chart for a second example of a method for assembling a composite wall assembly edge joint.

A second example of a method for assembling a composite wall assembly 12 edge joint 16 includes method 200, as set forth in FIG. 10. The components of the assembly of composite wall assembly 12 edge joint 16 fabricated under method 200 that are common to previously described components for the assembling of composite wall assembly 12 edge joint 16 fabricated under method 100 are similarly numbered. As will be appreciated herein, the assembly fabricated under the second example of a method or method 200, in contrast to the assembly fabricated under method 100, the components of composite wall assembly 12 edge joint 16 under method 200 are co-cured.

Figure 11:
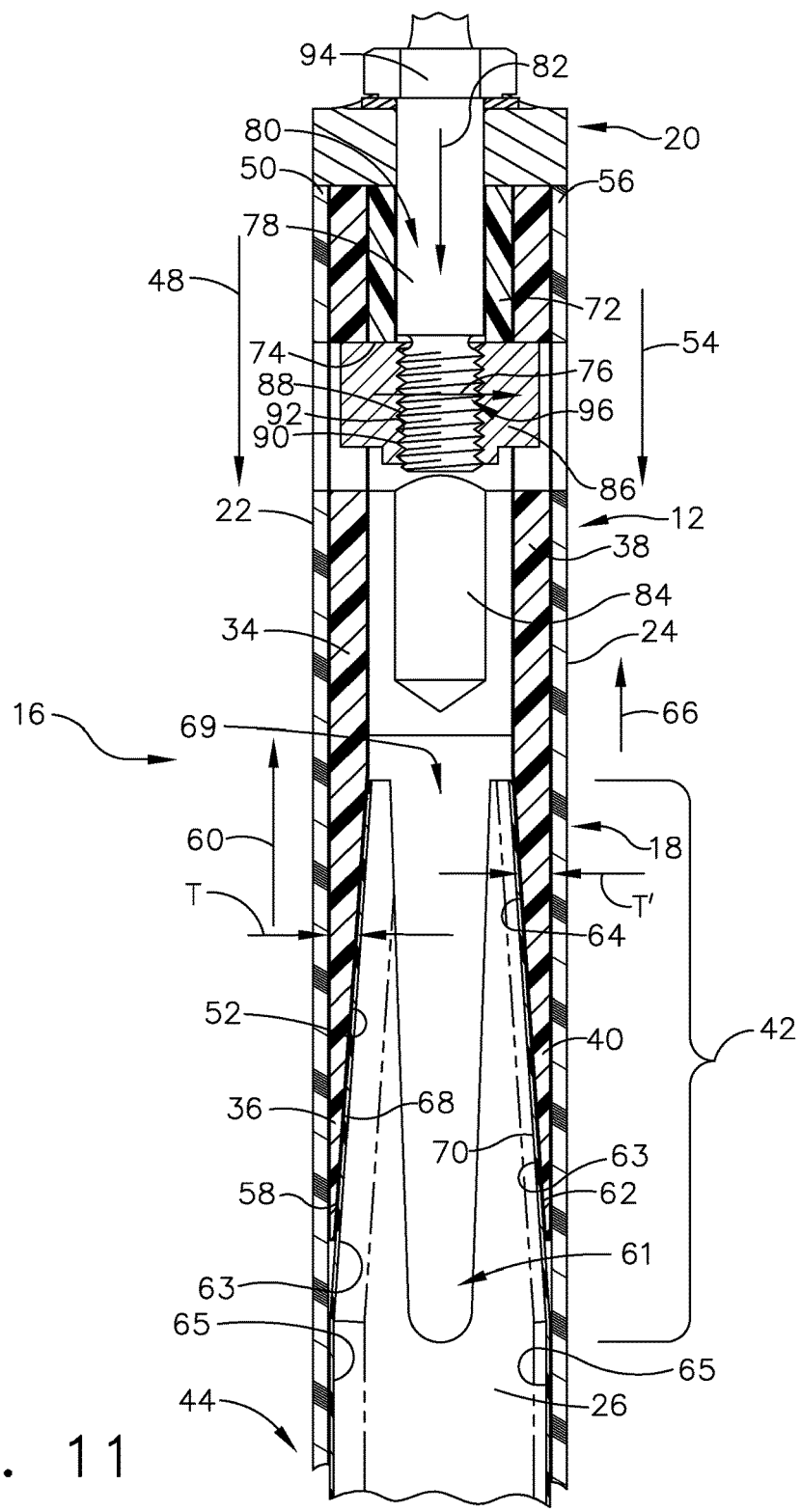
FIG. 11 is a cross section view of the joint edge of the composite wall assembly as seen along line 7-7 in FIG. 3 wherein this joint edge is assembled in accordance with the second example of the method for assembling a composite wall assembly edge joint as set forth in FIG. 10.

In referring to FIG. 10, method 200 for assembling a composite wall assembly 12 edge joint 16, includes step 202 of laying up first composite face sheet 22, as seen in FIG. 11. In this example, first composite face sheet 22 is an inboard face sheet of this assembly. Method 200 further includes step 204 of laying up a first composite buildup pad 34 having a first tapered section 36 onto first composite face sheet 22. Step 206 includes positioning composite flute core member 26 which includes tapered first portion 42 with first inclined surface 52 and second inclined surface 64. First inclined surface 58 of composite flute core member 26 is positioned onto first tapered section 36 of first composite buildup pad 34. Second portion 44 of composite flute core member 26 extends from tapered first portion 42 along first composite face sheet 22.

Method 200 further includes step 208 of laying up second composite buildup pad 38 having second tapered section 40. Second composite buildup pad 38 is positioned spaced apart from first composite buildup pad 34 having at least a portion of second tapered section 40 of second composite buildup pad 38 overlying second inclined surface 62 of tapered first portion 42 of composite flute core member 26.

Step 204 of laying up first buildup pad 34 further includes the step of laying up of first buildup pad 34 to extend in a direction away from first end 50 of first composite face sheet 22 with first tapered section 36 having first inclined surface 52 with first tapered section having a thickness T reducing in dimension as first composite buildup pad 34 extends in direction 48 away from first end 50.

Step 206 of positioning of composite flute core member 26 further includes positioning first inclined surface 58 of composite flute core member 26 overlying first tapered section 36 having a first inclined surface 52 of first composite buildup pad 34, such that first inclined surface 58 of composite flute core member 26 increases in distance away from first composite face sheet 22 as composite flute core member 26 extends in direction 60 toward first end 50 of first composite sheet face 22.

Step 208 of laying up second composite buildup pad 38 having second tapered section 40 including configuring second tapered section 40 having a second inclined surface 64 with second tapered section reducing in thickness T' as second composite buildup pad 38 extends in a direction 54 away from first end 50 of first composite face sheet 22. Second inclined surface 62 of tapered first portion 42 of composite flute core member 26 is positioned closer to first composite face sheet 22 as second inclined surface 62 of composite flute core member 26 extends in direction 66 toward first end 50 of first composite face sheet 22.

Method 200 further includes a step of laying up second composite face sheet 24 onto second composite buildup pad 38 and onto second portion 44 of composite flute core member 26. Second portion 44 of composite flute core member 26 extends from tapered first portion 42 of composite flute core member 26.

In fabricating composite joint edge assembly 16 under method 200, the composite material will be supported during the assembling of the composite material and co-curing of joint edge assembly 16. The supporting of the composite material will maintain the composite material in alignment and free from distortion that would otherwise be imparted to the composite material by the weight of the composite material prior to the composite material being cured. Support will be provided within interior 61 of composite flute core member 26 and within spacing 73 between first composite build up pad 34 and second composite build up pad 38, seen for example in FIG. 13.

Figure 12:
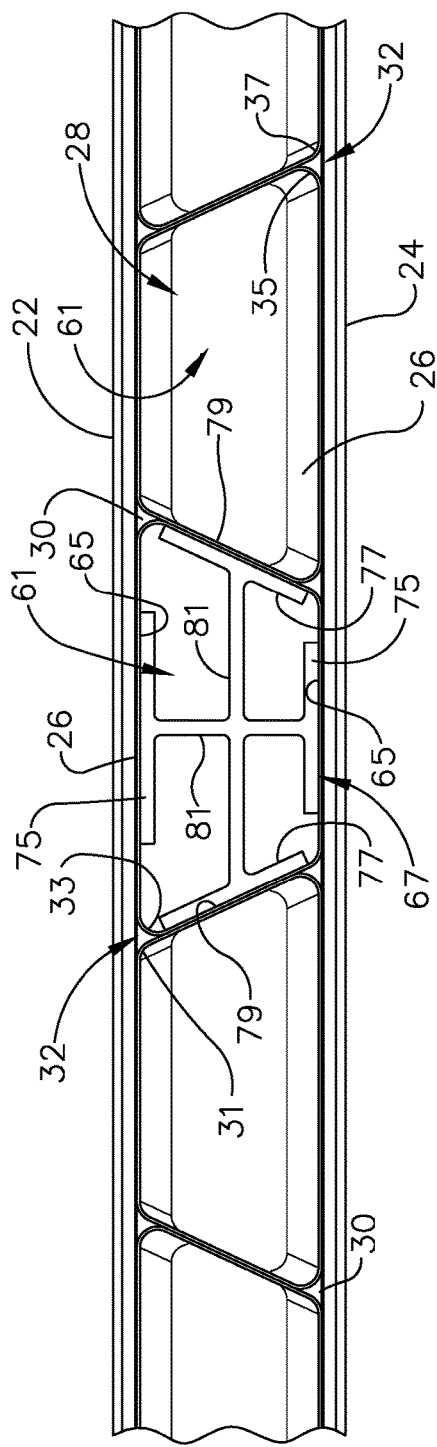
FIG. 12 is the cross section as shown in FIG. 4 wherein the composite flute core member is supported with a collapsible support during layup of an edge joint assembly for the second example of the method for assembling the composite wall assembly edge joint.
Figure 13:
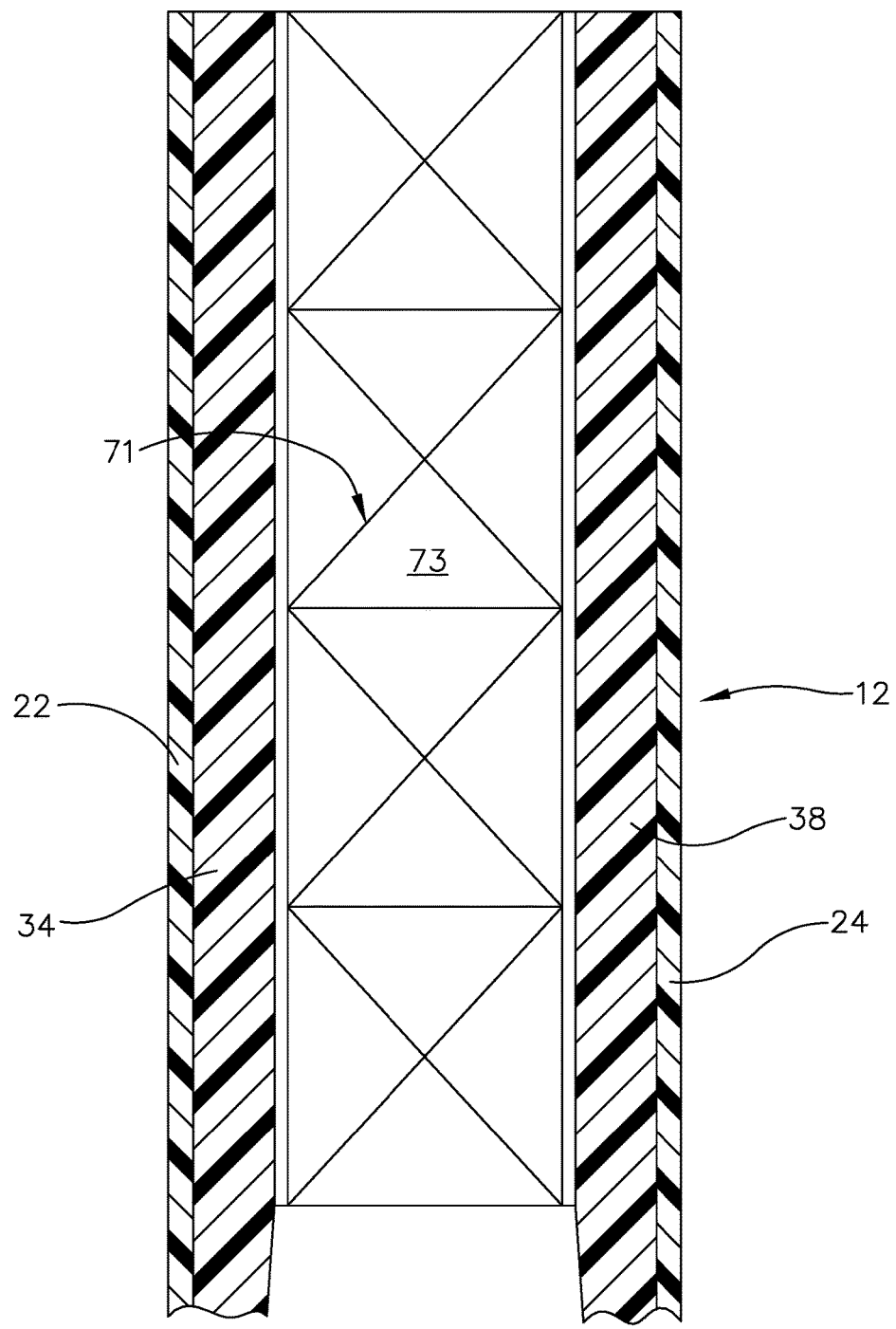
FIG. 13 is a cross section view showing the providing of support between spaced apart first and second composite buildup pads during assembly of edge joint.

In supporting composite flute core member 26, support is provided within interior 61 on opposing surfaces 63 of tapered first portion 42, opposing surfaces 65 of second portion 44 of composite flute core member 26 as well as opposing surfaces 79 on opposing side walls, as seen in FIG. 12. One example of supporting composite flute core member 26 includes a step of inserting pressurized gas into interior 61 of composite flute core member 26. Interior 61 is sealed off, not shown, and an access can be provided to interior 61 to adjust the pressurization within interior 61 as needed. The pressurized gas can be released from interior 61 of composite flute core member 26 when the co-curing process is completed. The pressurized gas can, as in this example, leave interior 61 of composite flute core member 26 and pass through space 73, as seen in FIG. 13, between first composite build up pad 34 and second composite build up pad 38.

Another example of supporting of composite flute core member 26 includes a step of inserting a collapsible support structure 67, as schematically shown in FIG. 12, into interior 61 of composite flute core member 26. Collapsible support structure 67 can be inserted in a collapsed position through space 73 positioned between first composite build up pad 34 and second composite build up pad 38 and through opening 69 of tapered first portion 42 of composite flute core member 26. With collapsible support structure 67 positioned within interior 61 of composite flute core member 26, collapsible support assembly 67 can be deployed such that plates 75 are positioned and provide support against interior 61 surface 65 positioned on opposing sides of composite flute core member 26 in second portion 44 of composite flute core member 26 as seen in FIGS. 11 and 12. Collapsible support assembly 67, in second portion 44 of composite flute core member 26 also includes plates 77 positioned in supporting position against interior 61 surface 79 positioned on opposing sides of composite flute core member 26 as seen in FIG. 12. Other plates of collapsible support assembly 67 (not shown) are positioned against interior surface 63 on opposing sides of tapered first portion 42 of composite flute core member 26 to provide support to tapered first portion 42 during assembly and co-curing. At the completion of co-curing collapsible support assembly 67 is collapsed and reduced in profile. Collapsible support assembly 67 is removed or otherwise pulled from interior 61 of composite flute core member 26 through opening 69 of composite flute core member 26 and then out of edge joint 16 through space 73 between first composite build up pad 34 and second composite build up pad 38. Removal of collapsible support assembly 67 through space 73 is accomplished with any obstructions in space 73 removed as needed. This is also the case with the removal of collapsible support from within tapered first portion 42 of composite flute core member 26 as needed.

Similarly support is needed to be positioned between first composite build up pad 34 and second composite build up pad 38 during assembling of edge joint 16 and during co-curing of edge joint 16. In referring to FIG. 13 a second support assembly 71 is positioned between first composite build up pad 34 and second composite build up pad 38. Second support assembly 71 is collapsible and can be inserted into space 73 in a collapsed or reduced profile and then extended and positioned against first composite build up pad 34 and second composite build up pad 38. At the time of completion of co-curing second support assembly 71, in this example, can be collapsed or reduced in profile and pulled out of space 73 and from edge joint 16.

The supporting, as discussed above, of the composite material in assembly of edge joint 16, permits the fabricator to maintain the composite material in alignment and undistorted during the assembly and through the desired co-curing process. With the support being provided by a collapsible structure or by a gas which can be released, the support can be removed from the interior of edge joint 16. In this example, space 73 that is provided between first composite build up pad 34 and second composite build up pad 38 with second support assembly 71 removed, space 73 provides the fabricator the opportunity to secure bridge composite structure 72, as will be discussed, between first composite build up pad 34 and second composite build up pad 38. With bridge composite structure 72 secured and positioned along edge joint 16, the fabricator can space bolts, as described herein, along bridge composite structure 72 as desired. The spacing of bolts along edge joint assembly 16 can provide enhanced load carrying capability with closer spacing of bolts, for example, with bolts connecting first section 18 and second section 20 of wall assembly 12. This enhanced load carrying capability is further supported with the transference of the load to the first and second buildup pads 34, 38, to the composite flute core members 26 and to first and second composite face sheets 22, 24.

Method 200 further includes a step of heating and co-curing first composite face sheet 22, first composite buildup pad 34, composite flute core member 26; second composite buildup pad 38 and second composite face sheet 24. In this example, where a circular construction of a rocket is being assembled, sections of edge joint 16 are assembled in sections up to approximately twenty degrees of the circumference of the rocket structure.

With the co-curing accomplished for edge joint 16, method 200 further includes a step of laying up composite bridge structure 72 and post bonding composite bridge structure 72 to first and second composite buildup pads 34, 38, as can be post bonded in position between first and second composite build up pads 34, 38, as seen in FIG. 11.

Method 200 further includes a step of drilling first hole 74 which extends in first direction 76 through first composite face sheet 22, first composite buildup pad 34, composite bridge structure 72, second composite buildup pad 38 and through second composite face sheet 24. Further included is a step of drilling first portion 78 of second hole 80 in composite bridge structure 72 in second direction 82 transverse to first direction 76 placing first portion 76 in communication with first hole 74. Drilling further includes drilling second portion 84 of second hole 80 positioned spaced apart from first portion 76 of second hole 80 across the first hole 74 and aligned with first portion 78 of second hole 80.

With first hole 74 and second hole 80 completed method 200 further includes a step of inserting barrel nut 86 into first hole 74 and inserting bolt 94 into second hole 80 and securing bolt 94 to barrel nut 86.

Figure 14:
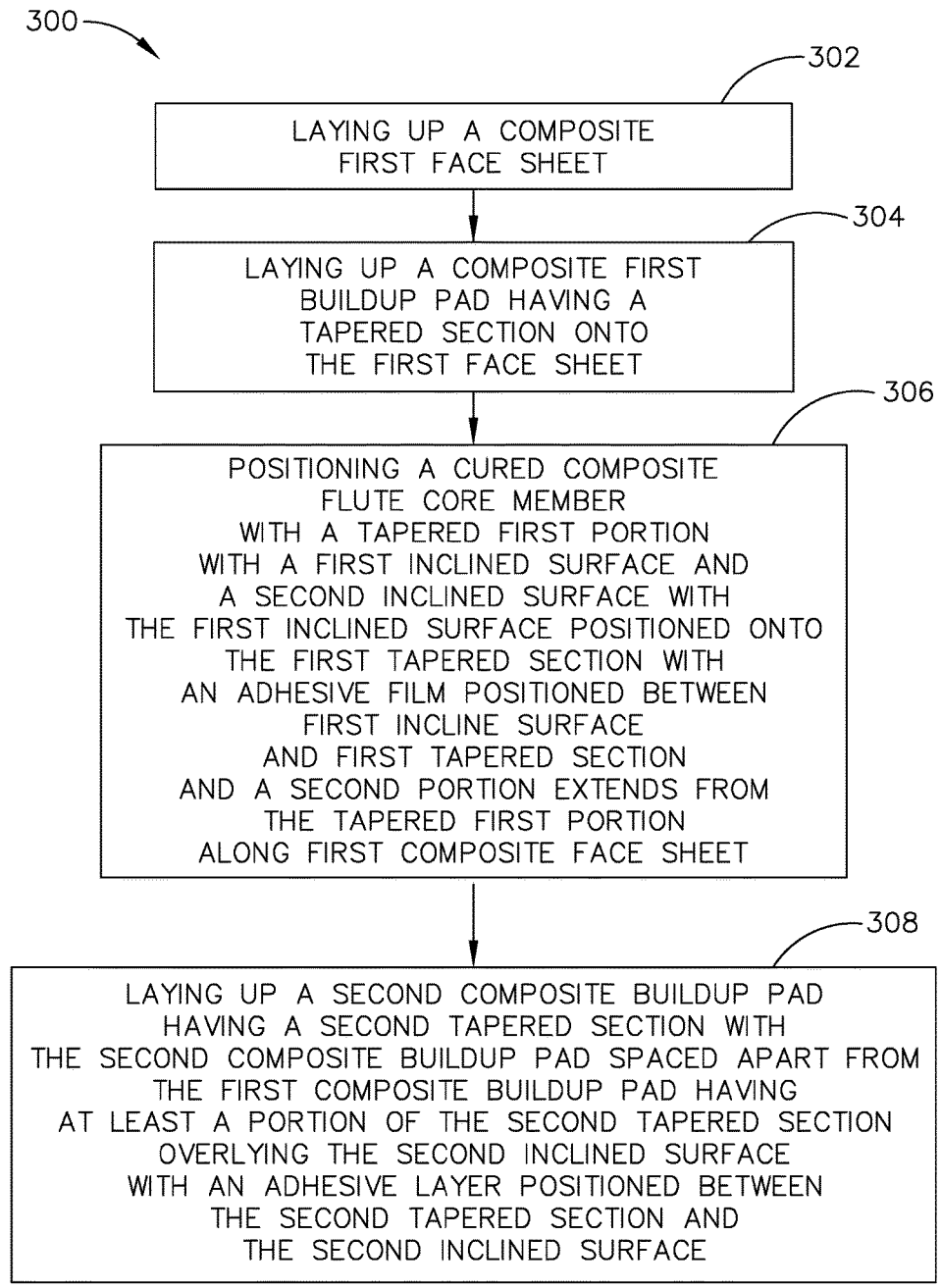
FIG. 14 is a flow chart for a third example of a method for assembling a composite wall assembly edge joint.

A third example of a method for assembling a composite wall assembly 12 edge joint 16 includes method 300, as set forth in FIG. 14. The components of the assembly of composite wall assembly 12 edge joint 16 fabricated under method 300 that are common to previously described components for the assembling of composite wall assembly 12 edge joint 16 fabricated under methods 100 and 200 are similarly numbered. As will be appreciated herein, the assembly fabricated under the third example of a method or method 300, in contrast to the assembly fabricated under method 200, the elements of composite wall assembly 12 edge joint 16 under method 300 employ a cured composite flute core member 26 in assembling edge joint 16.

Figure 15:
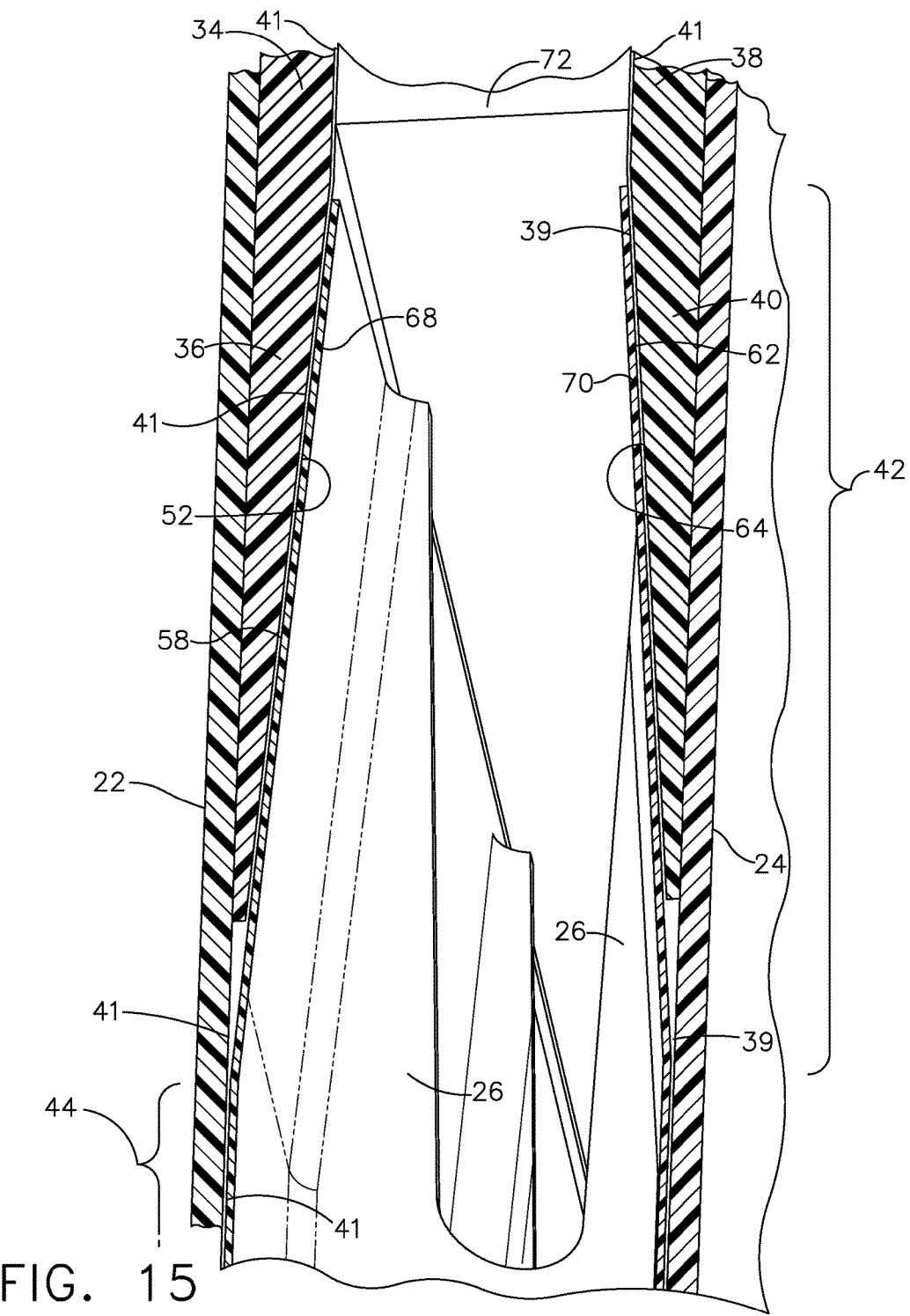
FIG. 15 is an enlarged view of that which is encircled as 8A in FIG. 8 showing an edge joint assembled in accordance with the third example of the method for assembling a composite wall assembly edge joint as set forth in FIG. 14.

In referring to FIG. 14, method 300 for assembling composite wall assembly 12 edge joint 16, includes step 302 of laying up composite first face sheet 22, as seen in FIG. 15. In this example, composite first face sheet 22 is an inboard face sheet of this assembly. Method 300 further includes step 304 of laying up a first composite buildup pad 34 having a first tapered section 36 onto composite first face sheet 22. Step 306 includes positioning cured composite flute core member 26 which includes tapered first portion 42 with first inclined surface 52 and second inclined surface 64. First inclined surface 52 of cured composite flute core member 26 is positioned onto first tapered section 36 with adhesive film 45 positioned between first inclined surface 52 and first tapered section 36. Second portion 44 of composite flute core member 26 extends from tapered first portion 42 along first composite face sheet 22 wherein adhesive film 45 is positioned between second portion 44 of composite flute core member 26 and composite first face sheet 22. Method 300 further includes step 308 laying up second composite buildup pad 38 having second tapered section 40 wherein second composite buildup pad 38 is positioned spaced apart from first composite buildup pad 34 having at least a portion of second tapered section 40 overlying second inclined surface 64 of tapered first portion 42 of composite flute core member 26 with adhesive layer 39 positioned between second tapered section 40 and second inclined surface 64 of tapered first portion 42 of composite flute core member 26.

Method 300 further includes a step of positioning support structure 71 between spaced apart first composite buildup pad 34 and second composite buildup pad 38, as seen in FIG. 13. Method 300 further includes a step of laying up a second composite face sheet 24 onto second composite build up pad 38 and in overlying relationship with second portion 44 of cured composite flute core member 26 with adhesive film 39, as seen in FIG. 15, positioned between second composite face sheet 24 and second portion 44 of composite flute core member 26.

Method 300 further includes a step of heating first composite face sheet 22, first composite buildup pad 34, composite flute core member 26, second composite buildup pad 38 and second composite face sheet 24. Method 300 further includes a step of laying up composite bridge structure 72 and post bonding composite bridge structure 72 to first and second composite buildup pads 34, 38.

Method 300 further includes, in this example, drilling first hole 74 in first direction 76, as seen for example in FIG. 11, through composite first face sheet 22, first composite buildup pad 34, composite bridge structure 72, second composite buildup pad 38 and second composite face sheet 24, as seen in FIG. 15. Further included is drilling first portion 78, as seen for example in FIG. 11, of second hole 80 in composite bridge structure 72 in second direction 82 transverse to first direction 76 placing first portion 78 in communication with first hole 74 and drilling second portion 84 of second hole 80 positioned spaced apart from first portion 78 of second hole 80 across first hole 74 and aligned with first portion 78 of second hole 80. Method 300 further includes inserting barrel nut 86 into first hole 74 and inserting bolt 94 into second hole 80 and securing bolt 94 to barrel nut 86.

Another example of a composite wall assembly 12 edge joint 10' will be discussed herein and seen in FIGS. 16-22. This example of joint edge 10' provides a robust edge joint 10' and provides ease in manufacturing the same. Composite wall assembly 12 edge joint 10', as seen for example in FIG. 16, includes first composite buildup pad 34 secured to first composite face sheet 22 with the first composite buildup pad 34 having a first tapered section 36 with a first inclined surface 52. First inclined surface 52 of first tapered section 36 extends in first direction 47 and first composite buildup pad 34 has second section 49 which extends from first tapered section 36 with second surface 29 which extends in second direction 81, different from first direction 47, toward first end 50 of first composite face sheet 22. Composite flute core member 26, further includes tapered first portion 42 secured to first tapered section 36 of first composite buildup pad 34. Composite flute core member 26 further includes second portion 44 which extends in third direction 11 away from tapered first portion 42 and is secured to first composite face sheet 22. Additionally, third portion 51, of composite flute core member 26, extends in the second direction, away from tapered first portion 42, toward the first end 50 of first composite face sheet 22 and is secured to second section 49 of first composite buildup pad 34.

Composite wall assembly 12 edge joint 16 further includes second composite buildup pad 38 secured to second composite face sheet 24, wherein the first and second composite face sheets 22, 24 are spaced apart with the second composite buildup pad 38. Second composite buildup pad 38 has second tapered section 40 with a second inclined surface 64 which extends in fourth direction 53. Second composite buildup pad 38 also has second section 55 which extends from second tapered section 40 with a third surface 57 which extends in fifth direction 59, different from fourth direction 53, toward second end 56 of second composite face sheet 24. Tapered first portion 42 of composite flute core member 26 is positioned and secured between first tapered sections 36, 40 of first and second composite buildup pads 34, 38, respectively. Second portion 44 of composite flute core member 26 is positioned between first and second composite face sheets 22, 24 and is secured to second composite face sheet 24. Third portion 51 of composite flute core member 26 is positioned between second section 49 of first composite buildup pad 34 and second section 55 of second composite buildup pad 38. Third core portion 51 is also secured to second section 55 of second composite build up pad 38.

Figure 16:
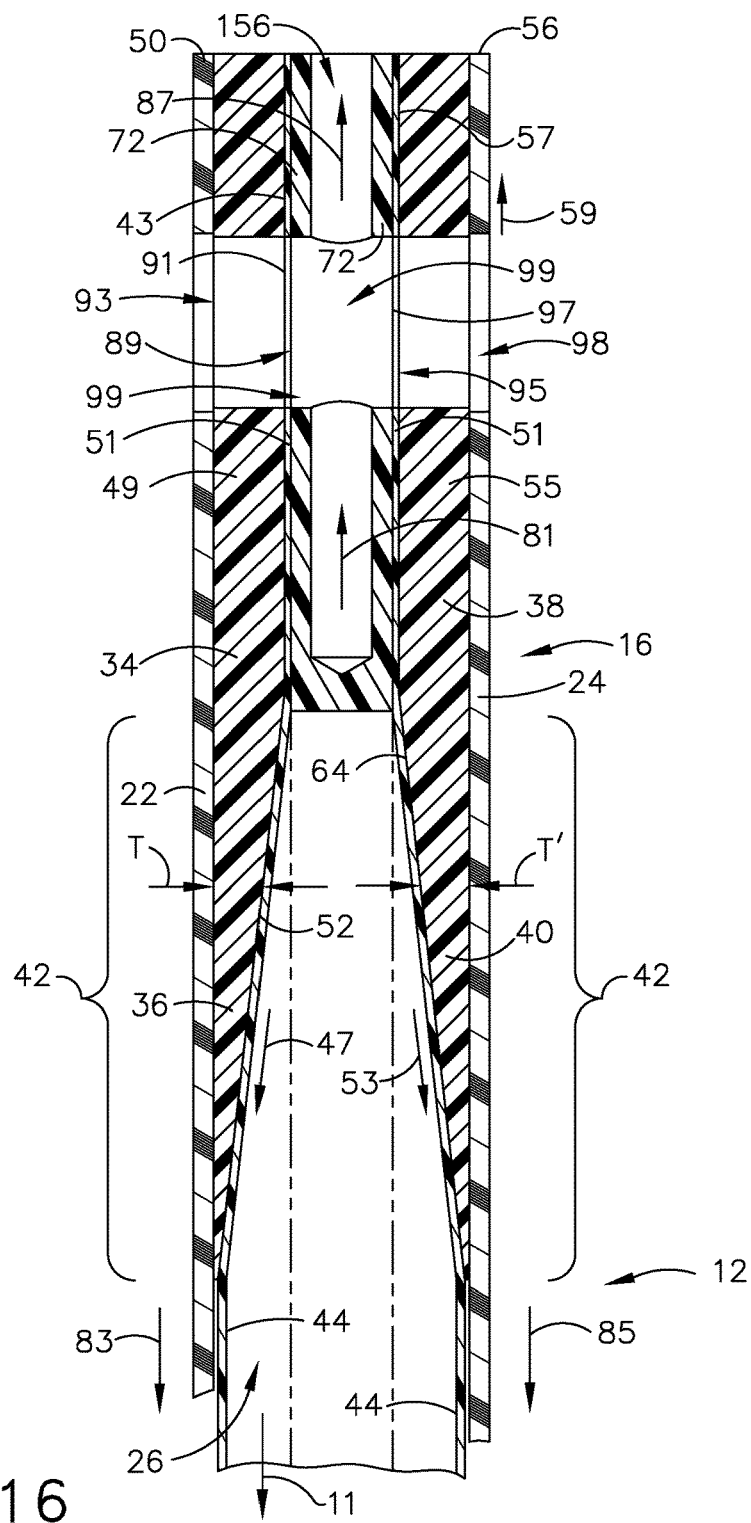
FIG. 16 is a cross section of the composite wall assembly edge joint which has been co-cured along line 16-16 as seen in FIG. 17.

In further referring to FIG. 16, first composite buildup pad 34 reduces in thickness dimension T as first composite buildup pad 34 extends in sixth direction 83 away from first end 50 of first composite face sheet 22. Second composite buildup pad 38 reduces in thickness dimension T' as second composite buildup pad 38 extends in seventh direction 85 away from second end 56 of second composite face sheet 24, such that first and fourth directions 47, 53 extend in diverging directions from one another. Second and fifth directions 81, 59 extend in same direction in relationship to one another. Second section 49 of first composite buildup pad 34 and second section 55 of second composite buildup pad 38 are spaced apart, as seen in FIG. 16.

Composite wall assembly 12 edge joint 16, in this example, further includes first composite buildup pad 34 extending to first end 50 of first composite face sheet 22. Second composite buildup pad 38 in this example also extends to second end 56 of second composite face sheet 24. Third portion 51, of composite flute core member 26, extends in eighth direction 87 toward first end 50 of first composite face sheet 22 and toward second end 56 of second composite face sheet 24. In this example, third portion 51 extends to first end 50 and second end 56. With third portion 51 of composite flute core member 26 secured to second section 49 and second section 55, a robust joint edge 16 construction is provided which facilitates load transference through joint edge 16. This robust construction provides the fabricator design choices when there may be a need to accommodate securing joint edge 16 to an adjoining joint edge, that may in certain examples, be constructed of an existing aluminum construction that have certain load transference requirements. With respect to connecting edge joint 16, third portion 51 defines first bore 89 positioned through first sidewall 91 of third portion 51 of composite flute core member 26 and is aligned with second bore 93 defined and positioned through first composite face sheet 22. Third portion 51 also defines third bore 95 positioned through second sidewall 97 of third portion 51 and is aligned with fourth bore 98 defined and positioned through second composite face sheet 24. As a result, first bore 89, second bore 93, third bore 95 and fourth bore 98 are in alignment.

Further included in composite wall assembly 12 edge joint 16 of FIG. 16 is bridge composite structure 72 positioned between and secured to first and second sidewalls 91, 97 of third portion 51 of composite flute core member 26. Bridge composite structure 72 defines fifth bore 99 which extends through bridge composite structure 72 and aligns with the first bore 89, second fore 93, third bore 95 and fourth bore 98. This bore alignment provides an opening to accommodate a connecting structure, such as a barrel nut as discussed earlier, for connecting and accommodating line loads with respect to an adjoining wall assembly connection.

In this example of edge joint 16, as mentioned above, third portion 51 extends to first end 50 of first composite face sheet 22 and second end 56 of second composite face sheet 24 providing this robust arrangement to extend to first and second ends 50, 56. Bridge structure 72 can be inserted within the spaced apart region 156 positioned between sidewalls 91 and 97 of third portion 51 and post be bonded to third portion 51, securing bridge structure 72 to provide further reinforcement to joint edge 16, particularly, in the region of placing a connector such as a barrel nut.

Figure 17:
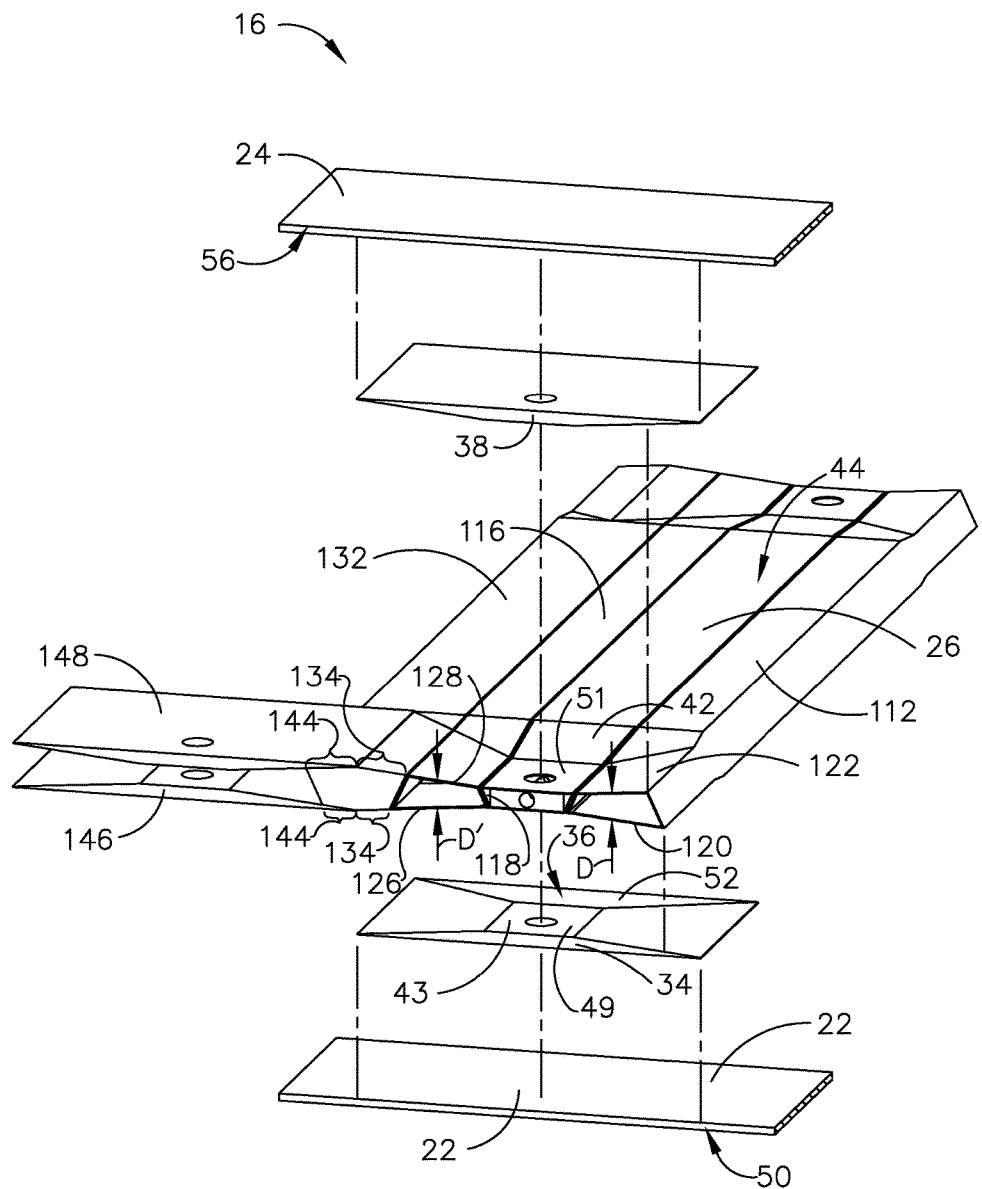
FIG. 17 is an exploded perspective view of the composite wall assembly edge joint.
Figure 18:
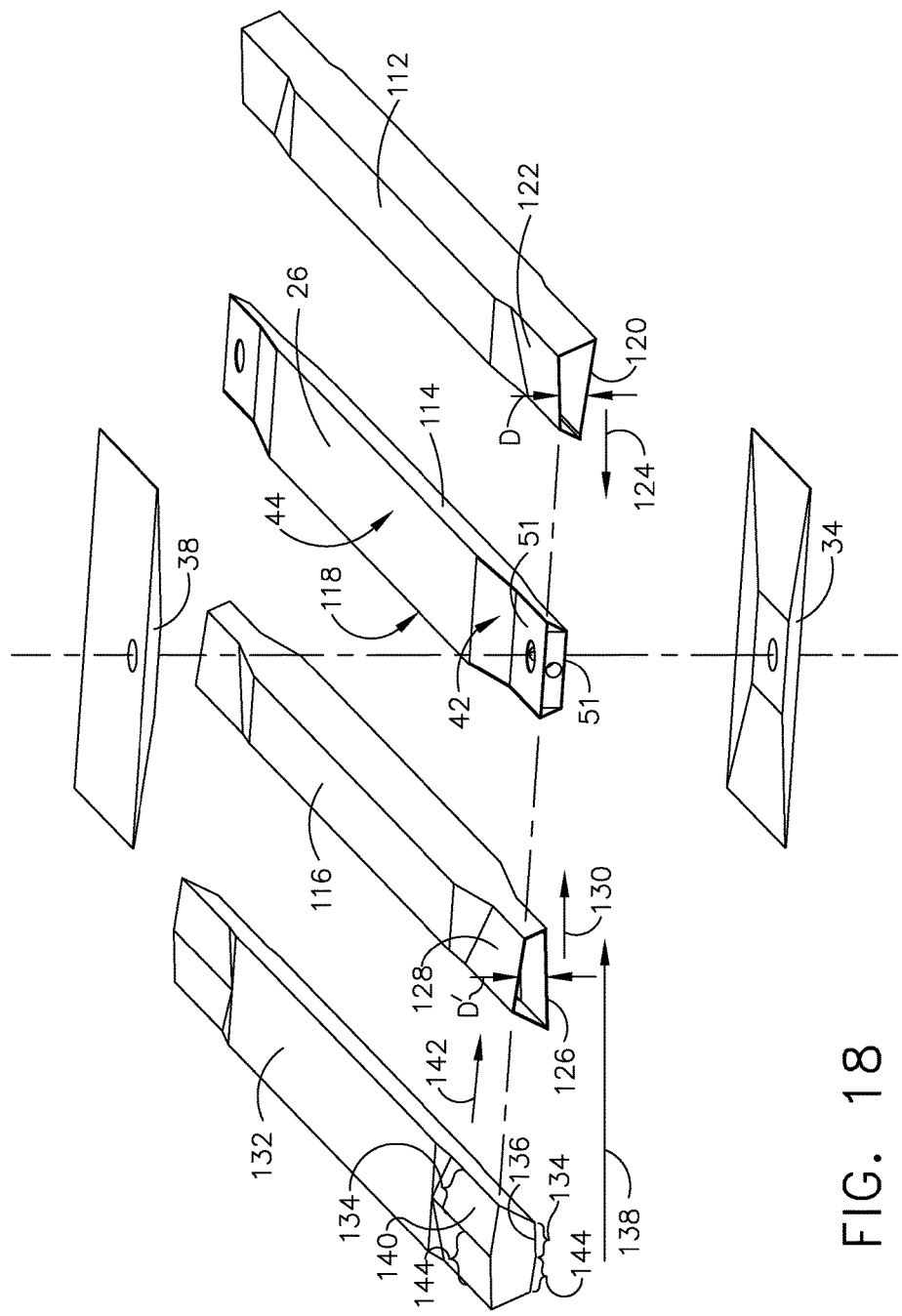
FIG. 18 is an exploded perspective view of the composite wall assembly edge joint exploded in a vertical and in a horizontal direction, without third and fourth composite build up pads and without first and second composite face sheets of FIG. 17.
Figure 19:
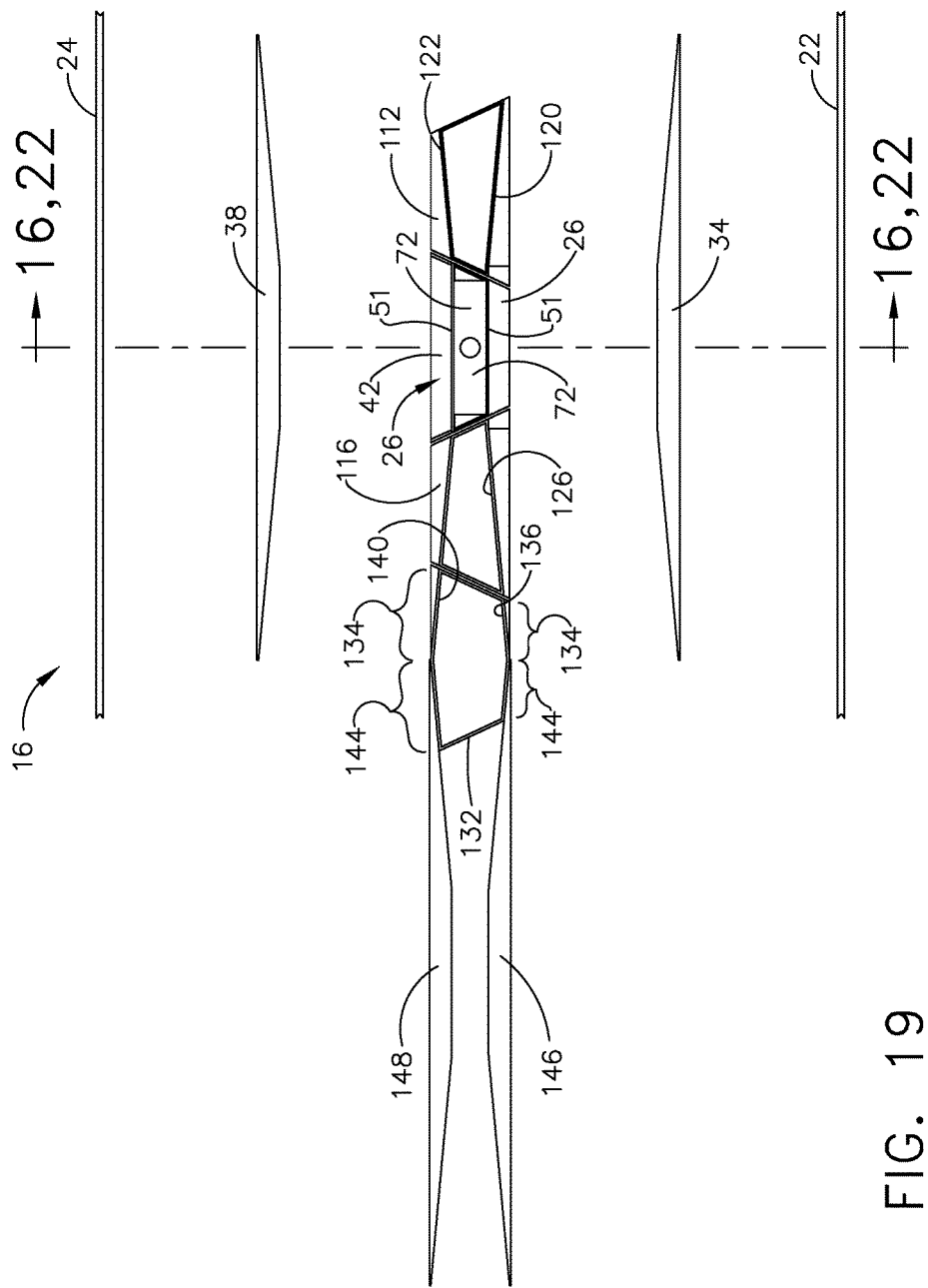
FIG. 19 is a partially exploded end view of the composite wall assembly edge joint of FIG. 17 with first and second composite face sheets added.

In referring to FIGS. 17-19, further assembly of edge joint 16 can be seen. Second composite flute core member 112 is positioned to extend between first and second composite buildup pads 34, 38 and adjoins third sidewall 114 of composite flute core member 26. Further included is third composite flute core member 116 which is positioned to extend between the first and second composite buildup pads 34, 38 and adjoins fourth sidewall 118 of composite flute core member 26 which opposes the third sidewall 114. Second composite flute core member 112 and third composite flute core member 116 extend between first and second composite build up pads 34, 38, in this example, to first end 50 of the first composite face sheet 22 and second end 56 of second composite face sheet 24, similar to that of composite flute core 26. First sidewall 120 of second composite flute core member 112 which adjoins first composite buildup pad 34 and second sidewall 122 of second composite flute core member 112 which adjoins second composite buildup pad 38, reduce in dimension D between first sidewall 120 and second side wall 122 as first and second sidewall 120, 122 of second composite flute core member 112 extends in ninth direction 124 toward composite flute core member 26. Similarly, first sidewall 126 of third composite flute core member 116 which adjoins first composite buildup pad 34 and second sidewall 128 of third composite flute core member 116 which adjoins second composite buildup pad 38, reduce in dimension D' between first sidewall 126 and second sidewall 128 as first and second sidewall 126, 128 of third composite flute core member 116 extend in tenth direction 130 toward composite flute core member 26. Fourth composite flute core member 132 includes first portion 134 positioned to extend between first and second composite buildup pads 34, 38 and adjoins third composite flute core 116 with first sidewall 136 of first portion 134 of fourth composite flute core member 132 adjoins first composite buildup pad 34 and extends in eleventh direction 138 of first sidewall 126 of third composite flute core member 116 and second sidewall 140 of first portion 134 of fourth composite flute core member 132 adjoins second composite buildup pad 38 and extends in twelfth direction 142 of second sidewall 128 of third composite flute core member 116. Second portion 144 of fourth composite flute core member 132 is positioned to extend between third composite buildup member 146 and fourth composite buildup member 148. First and third composite buildup members 34, 146 adjoin one another and second and fourth composite buildup members 38, 148 adjoin one another.

Figure 20:
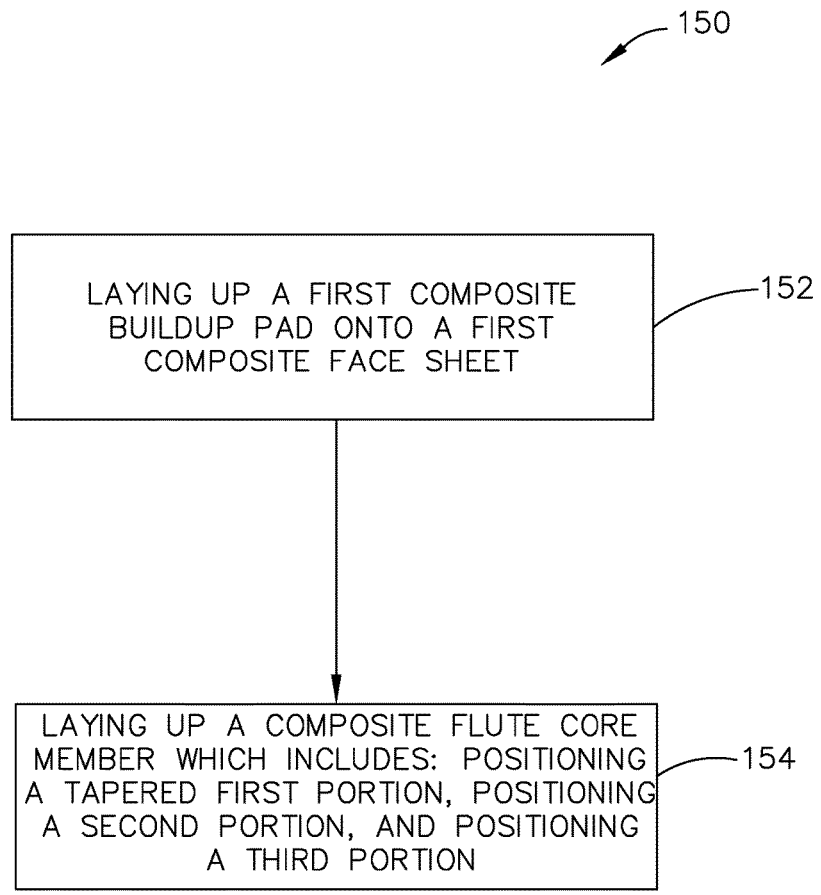
FIG. 20 is a flow chart for a method for assembling the composite wall assembly edge joint which will be co-cured, of FIG. 16.

Further included is method 150, as shown in FIG. 20, for assembling composite wall assembly 12 edge joint 16, as seen in FIG. 16, which will be co-cured. Method 150, includes step 152 of laying up first composite buildup pad 34 onto first composite face sheet 22. Method 150 further includes laying up composite flute core member 26 which includes positioning tapered first portion 42, positioning second portion 44 and positioning third portion 51 which will be further discussed. Step 152 of laying up first composite buildup pad 34 onto first composite face sheet 22 with first composite buildup pad 34 having first tapered section 36 with first inclined surface 52 which extends in first direction 47, as seen in FIG. 16. Step 152 further includes first composite buildup pad 34 having second section 49 which extends from first tapered section 36 with a second surface 29 which extends in second direction 81, different from first direction 47, toward first end 50 of first composite face sheet 22.

Method 150 further includes step 154 of laying up composite flute core member 26 which includes positioning tapered first portion 42 onto tapered first section 36 of first composite buildup pad 34 and positioning second portion 44 to extend in third direction 11 away from first tapered portion 42 onto first composite face sheet 22. Step 154 further includes positioning third portion 51, to extend in the second direction, away from first tapered portion 42, toward first end 50 of first composite face sheet 22 and onto second section 49 of first composite buildup pad 34.

Method 150 further includes laying up second composite buildup pad 38 onto composite flute core member 26 which includes positioning second composite buildup pad 38 having second tapered section 40 with second inclined surface 64 which extends in fourth direction 53 onto tapered first portion 42 of composite flute core member 26. Method 150 further includes positioning second section 55 which extends from second tapered section 40 with third surface 57 and which extends in fifth direction 59, different from fourth direction 53, onto third portion 51 of composite flute core member 26. Method 150 further includes laying up second composite face sheet 24 onto second buildup pad 38 and onto second portion 44 of composite flute core member 26. Additionally, method 150 includes co-curing first composite face sheet 22, first composite buildup pad 34, composite flute core member 26, second composite buildup pad 38 and second composite face sheet 24. Various support methodologies such as discussed earlier provide the support needed to layup edge joint 16. The support provided is removable through open space or end 156 of edge joint 16, seen in FIG. 16. Upon removal of the support, bridge structure 72 is permitted to be inserted within third portion 51 of composite flute core member 26 and post bonded to third portion 51.

Figure 21:
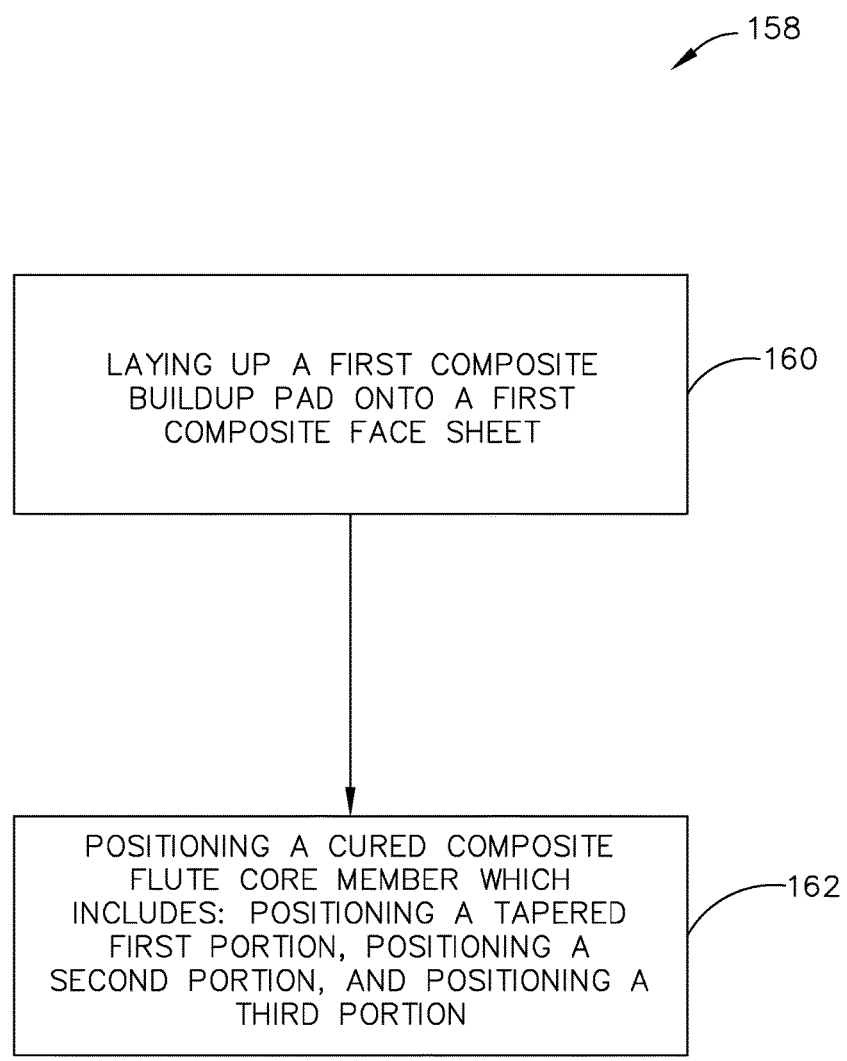
FIG. 21 is a flow chart for a method for assembling the composite wall assembly edge joint which includes co-bonding a pre-cured composite flute core member within the composite wall assembly edge joint of FIG. 22.
Figure 22:
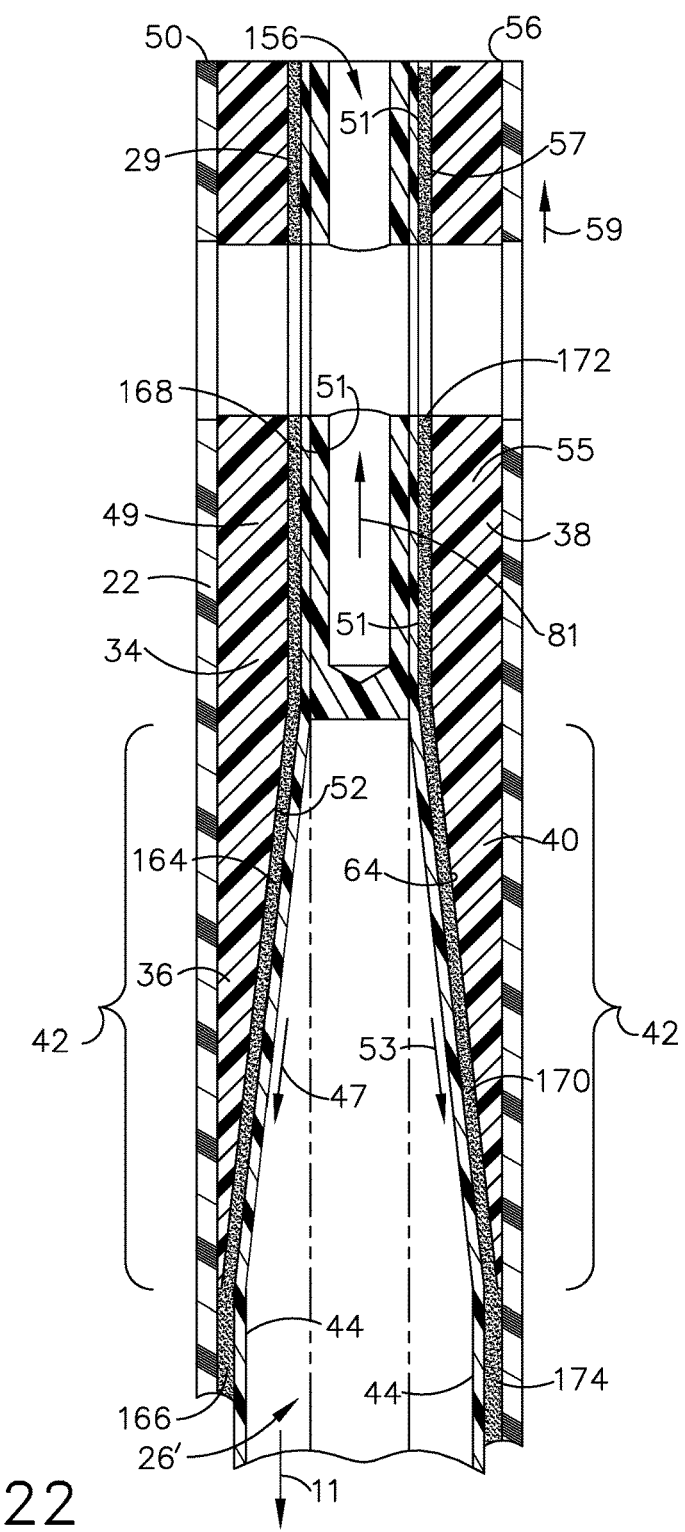
FIG. 22 is a cross section of another example of the composite wall assembly edge joint with the composite flute core member pre-cured.

Another method 158, as seen in FIG. 21, for assembling composite wall assembly 12 edge joint 16 includes employment of pre-cured composite flute core member 26' of FIG. 22. Method 158 includes step 160 of laying up first composite buildup pad 34 onto first composite face sheet 22. Step 160 further includes first composite buildup pad 34 having first tapered section 36 with first inclined surface 52 which extends in first direction 47 and having second section 49 which extends from first tapered section 36. Second section 49 has second surface 29 which extends in second direction 81, different from first direction 47, toward first end 50 of first composite face sheet 22.

Method 158 further includes step 162 of positioning cured composite flute core member 26', which includes positioning tapered first portion 42 onto first tapered section 36 of first composite buildup pad 34, with adhesive film portion 164 positioned between tapered first portion 42 and first tapered section 36 of first composite buildup pad 34. Step 162 further includes positioning second portion 44, to extend in third direction 11 away from tapered first portion 42, onto first composite face sheet 22 with adhesive film portion 166 positioned between second portion 42 and first composite face sheet 22. Additionally, step 162 includes positioning third portion 51, to extend in the second direction 81, away from the tapered first portion 42, toward the first end 50 of first composite face sheet 22, onto second section 49 of first composite buildup pad 34 with adhesive film portion 168 positioned between third core portion 51 and second section 49 of first composite buildup pad 34.

In assembling edge joint 16 in accordance with method 158 described above, adhesive film portions 164, 166 and 168 can be a continuous adhesive film extending between first composite buildup pad 34 and composite flute core member 26' and between first composite face sheet 22 and composite flute core member 26'. Alternatively, film portions 164, 166 and 168 can be any number of separate sections of adhesive film extending between first composite buildup pad 34 and composite flute core member 26' and between first composite face sheet 22 and composite flute core member 26'. Other constructions of film portions 164, 166 and 168 can include a combination of continuous adhesive film and/or sections of adhesive film as desired.

Method 158 further includes laying up second composite buildup pad 38 onto cured composite flute core member 26' which includes positioning second composite buildup pad 38 having second tapered section 40 with second inclined surface 64 which extends in fourth direction 53 onto tapered first portion 42 of composite flute core member 26' with adhesive film portion 170 positioned between second tapered section 40 and tapered first portion 40. Method 158 further includes positioning second section 55 of second composite buildup pad 38, which extends from second tapered section 40 with third surface 57 which extends in fifth direction 59, different from fourth direction 59, onto third portion 51 of composite flute core member 26' with adhesive film portion 172 positioned between third portion 172 and second section 55 of second composite buildup pad 38.

Method 158 further includes laying up second composite face sheet 24 onto second composite buildup pad 38 and onto second portion 44 of cured composite flute core member 26' with adhesive film portion 174 positioned between second portion 44 of cured composite flute core member 26' and second composite face sheet 24.

In assembling edge joint 16 in accordance with method 158 described above, adhesive film portions 170, 172 and 174 can also be a continuous adhesive film extending between second composite buildup pad 38 and composite flute core member 26' and between second composite face sheet 24 and composite flute core member 26'. Alternatively, film portions 170, 172 and 174 can be any number of separate sections of adhesive film extending between first composite buildup pad 34 and composite flute core member 26' and between first composite face sheet 22 and composite flute core member 26'. Other constructions of film portions 170, 172 and 174 can include a combination of continuous adhesive film and/or sections of adhesive film as desired.

Method 158 further includes co-bonding first composite face sheet 22 with second portion 44 of composite flute core member 26'; co-bonding first tapered section 36 of first composite buildup pad 34 with tapered first portion 42 of composite flute core member 26'; co-bonding second composite face sheet 24 with second portion 44 of the composite flute core member 26'; co-bonding second tapered section 40 of second composite buildup pad 38 with tapered first portion 42 of composite flute core member 26'; and co-curing first composite face sheet 22 with first composite buildup pad 34 and second composite face sheet 24 with second composite buildup pad 38.

While various embodiments have been described above, this disclosure is not intended to be limited thereto. Variations can be made to the disclosed embodiments that are still within the scope of the appended claims.

What is claimed:

1. A composite wall assembly edge joint, comprising:
    a first composite buildup pad secured to a first composite face sheet with the first composite buildup pad having a first tapered section with a first inclined surface which extends in a first direction and having a second section which extends from the first tapered section with a second surface which extends in a second direction, different from the first direction, toward a first end of the first composite face sheet; and
    a composite flute core member, comprising:
        a tapered first portion secured to the first tapered section of the first composite buildup pad;
        a second portion which extends in a third direction away from the tapered first portion and is secured to the first composite face sheet; and
        a third portion which extends in the second direction, away from the tapered first portion, toward the first end of the first composite face sheet secured to the second section of the first composite buildup pad.

2. The composite wall assembly edge joint of claim 1, further including:
    a second composite buildup pad secured to a second composite face sheet wherein the first and second composite face sheets are spaced apart with the second composite buildup pad having a second tapered section with a second inclined surface which extends in a fourth direction and having a second section which extends from the second tapered section with a third surface which extends in a fifth direction, different from the fourth direction, toward a second end of the second composite face sheet, wherein:
        the tapered first portion of the composite flute core member is positioned and secured between the first tapered sections of the first and second composite buildup pads respectively;
        the second portion is positioned between the first and second composite face sheets and secured to the second composite face sheet; and
        the third portion is positioned between the second section of the first composite buildup pad and the second section of the second composite buildup pad and secured to the second section of the second composite build up pad.

3. The composite wall assembly edge joint of claim 2, wherein:
    the first composite buildup pad reduces in a thickness dimension as the first composite buildup pad extends in a sixth direction away from the first end of the first composite face sheet; and
    the second composite buildup pad reduces in a thickness dimension as the second composite buildup pad extends in a seventh direction away from the second end of the second composite face sheet such that the first and fourth directions extend in diverging directions from one another.

4. The composite wall assembly edge joint of claim 2, wherein:
    the second and fifth directions extend in a same direction in relationship to one another; and
    the second section of the first composite buildup pad and the second section of the second composite buildup pad are spaced apart.

5. The composite wall assembly edge joint of claim 2, wherein:
    the first composite buildup pad extends to the first end of the first composite face sheet; and
    the second composite buildup pad extends to the second end of the second composite face sheet.

6. The composite wall assembly edge joint of claim 2, wherein:
    the third portion extends in a eighth direction toward the first end of the first composite face sheet and the second end of the second composite face sheet; and
    the third portion defines a first bore positioned through a first sidewall of the third portion aligned with a second bore defined and positioned through the first composite face sheet and the third portion defines a third bore positioned through a second sidewall of the third portion aligned with a fourth bore defined and positioned through the second composite face sheet.

7. The composite wall assembly edge joint of claim 6, wherein:
    a bridge composite structure is positioned between and secured to the first and second sidewall of the third portion of the composite flute core member; and
    the bridge composite structure defines a fifth bore which extends through the bridge composite structure and aligns with the first bore, second bore, third bore and fourth bore.

8. The composite wall assembly edge joint of claim 6, wherein the third portion extends to the first end of the first composite face sheet and the second end of the second composite face sheet.

9. The composite wall assembly edge joint of claim 2, further including:
    a second composite flute core member is positioned to extend between the first and second composite buildup pads and adjoins a third sidewall of the composite flute core member; and
    a third composite flute core member is positioned to extend between the first and second composite buildup pads and adjoins a fourth sidewall of the composite flute core member which opposes the third sidewall.

10. The composite wall assembly edge joint of claim 9, wherein the second composite flute core member and the third composite flute core member extend between the first and second composite build up pads to the first end of the first composite face sheet and the second end of the second composite face sheet.

11. The composite wall assembly edge joint of claim 9, wherein:
    a first sidewall of the second composite flute core member which adjoins the first composite buildup pad and a second sidewall of the second composite flute core member which adjoins the second composite buildup pad reduce in dimension between the first sidewall and second side wall as the first and second sidewall of the second composite flute core member extend in a ninth direction toward the composite flute core member; and
    a first sidewall of the third composite flute core member which adjoins the first composite buildup pad and a second sidewall of the third composite flute core member which adjoins the second composite buildup pad reduce in dimension between the first sidewall and second sidewall as the first and second sidewall of the third composite flute core member extend in a tenth direction toward the composite flute core member.

12. The composite wall assembly edge joint of claim 11 further including a fourth composite flute core member, wherein:
a first portion of the fourth composite flute core member is positioned to extend between the first and second composite buildup pads and adjoin the third composite flute core with a first sidewall of the first portion of the fourth composite flute core member adjoins the first composite buildup pad and extends in an eleventh direction of the first sidewall of the third composite flute core member and second sidewall of the first portion of the fourth composite flute core member adjoins the second composite buildup pad and extends in a twelfth direction of the second sidewall of the third composite flute core member;
a second portion of the fourth composite flute core member is positioned to extend between a third composite buildup member and a fourth composite buildup member; and
the first and third composite buildup members adjoin one another and the second and fourth composite buildup members adjoin one another.

13. A method of for assembling a composite wall assembly edge joint, comprising:
laying up a first composite buildup pad onto a first composite face sheet with the first composite buildup pad having a first tapered section with a first inclined surface which extends in a first direction and having a second section which extends from the first tapered section with a second surface which extends in a second direction, different from the first direction, toward a first end of the first composite face sheet; and
laying up a composite flute core member which includes:
positioning a tapered first portion onto the tapered first section of the first composite buildup pad;
positioning a second portion, to extend in a third direction away from the first tapered portion, onto the first composite face sheet; and
positioning a third portion, to extend in the second direction, away from the first tapered portion, toward the first end of the first composite face sheet and onto the second section of the first composite buildup pad.

14. The method for assembling a composite wall assembly edge joint of claim 13, further includes:
laying up a second composite buildup pad onto the composite flute core member, comprising positioning the second composite buildup pad having a second tapered section with a second inclined surface which extends in a fourth direction onto the tapered first portion of the composite flute core member; and positioning a second section, which extends from the second tapered section with a third surface and which extends in a fifth direction different from the fourth direction, onto the third portion of the composite flute core member.

15. The method for assembling a composite wall assembly edge joint of claim 14, further includes laying up a second composite face sheet onto the second buildup pad and onto the second portion of the composite flute core member.

16. The method for assembling a composite wall assembly edge joint of claim 15, further includes co-curing the first composite face sheet, the first composite buildup pad, the composite flute core member, the second composite buildup pad and the second composite face sheet.

17. A method of for assembling a composite wall assembly edge joint, comprising:
laying up a first composite buildup pad onto a first composite face sheet with the first composite buildup pad having a first tapered section with a first inclined surface which extends in a first direction and having a second section which extends from the first tapered section with a second surface which extends in a second direction, different from to the first direction, toward a first end of the first composite face sheet; and
positioning a cured composite flute core member which includes:
positioning a tapered first portion onto the first tapered section of the first composite buildup pad with an adhesive film portion positioned between the tapered first portion and the first tapered section of the first composite buildup pad;
positioning a second portion, to extend in a third direction away from the tapered first portion, onto the first composite face sheet with an adhesive film portion positioned between the second portion and the first composite face sheet; and
positioning a third portion, to extend in the second direction, in a direction away from the tapered first portion, toward the first end of the first composite face sheet, onto the second section of the first composite buildup pad with an adhesive film portion positioned between the third core portion and second section of the first composite buildup pad.

18. The method for assembling a composite wall assembly edge joint of claim 17, further includes:
laying up a second composite buildup pad onto the cured composite flute core member, comprising:
positioning the second composite buildup pad having a second tapered section with a second inclined surface which extends in a fourth direction onto the tapered first portion of the composite flute core member with an adhesive film portion positioned between the second tapered section and the tapered first portion; and
positioning a second section of the second composite buildup pad which extends from the second tapered section with a third surface which extends in a fifth direction, different from the fourth direction, onto the third portion of the composite flute core member with adhesive film portion positioned between the third portion and the second section of the second composite buildup pad.

19. The method for assembling a composite wall assembly edge joint of claim 18, further includes laying up a second composite face sheet onto the second composite buildup pad and onto the second portion of the cured composite flute core member with an adhesive film portion positioned between the second portion of the cured composite flute core member and the second composite face sheet.

20. The method for assembling a composite wall assembly edge joint of claim 19, further includes:
co-bonding the first composite face sheet with the second portion of the composite flute core member;
co-bonding first tapered section of the first composite buildup pad with the tapered first portion of the composite flute core member;

co-bonding the second composite face sheet with the second portion of the composite flute core member;

co-bonding the second tapered section of the second composite buildup pad with the tapered first portion of the composite flute core member; and co-curing the first composite face sheet with the first composite buildup pad and the second composite face sheet with the second composite buildup pad.

\* \* \* \* \*

UNITED STATES PATENT AND TRADEMARK OFFICE
CERTIFICATE OF CORRECTION

Page 1 of 1

PATENT NO. : 10,138,627 B2
APPLICATION NO. : 15/614041
DATED : November 27, 2018
INVENTOR(S) : Douglas McCarville et al.

It is certified that error appears in the above-identified patent and that said Letters Patent is hereby corrected as shown below:

On the Title Page

At item (63), Line 2, "2017." should be -- 2017, now Pat. No. 10,173,406. --.

In the Claims

At Column 19, Line 28, Claim 13 "method of for" should be -- method for --.

At Column 20, Line 4, Claim 17 "method of for" should be -- method for --.

Signed and Sealed this
Fourteenth Day of May, 2019

Andrei Iancu
*Director of the United States Patent and Trademark Office*